United States Patent [19]

Veeneman et al.

[11] Patent Number: 5,774,874
[45] Date of Patent: Jun. 30, 1998

[54] MULTI-MERCHANT GIFT REGISTRY

[75] Inventors: William J. Veeneman, Minneapolis; Barbara Thomas, Chanhassen; Debra Remington, Hopkins, all of Minn.

[73] Assignee: The Gift Certificate Center, Minneapolis, Minn.

[21] Appl. No.: 562,014

[22] Filed: Nov. 22, 1995

Related U.S. Application Data

[63] Continuation-in-part of Ser. No. 132,604, Oct. 6, 1993, abandoned, which is a continuation-in-part of Ser. No. 62,470, May 14, 1993, abandoned.

[51] Int. Cl.$^6$ .................................................. G06F 17/60
[52] U.S. Cl. ............................................... 705/27; 705/14
[58] Field of Search ................................... 395/227, 226, 395/228, 229, 218, 214, 201; 705/27, 26, 28, 29, 18, 14, 1

[56] References Cited

U.S. PATENT DOCUMENTS

| | | |
|---|---|---|
| 3,445,633 | 5/1969 | Ratner . |
| 3,622,995 | 11/1971 | Dilks et al. . |
| 3,804,007 | 4/1974 | Arciprete et al. . |
| 4,166,945 | 9/1979 | Inoyama . |
| 4,554,446 | 11/1985 | Murphy et al. . |
| 4,720,785 | 1/1988 | Shapiro . |
| 4,809,837 | 3/1989 | Hayashi . |
| 4,815,741 | 3/1989 | Small . |
| 4,916,441 | 4/1990 | Gombrich . |
| 5,047,614 | 9/1991 | Bianco . |
| 5,083,638 | 1/1992 | Schneider . |
| 5,160,171 | 11/1992 | Gregory et al. . |
| 5,192,854 | 3/1993 | Counts . |
| 5,208,445 | 5/1993 | Nahar et al. . |
| 5,243,174 | 9/1993 | Veeneman . |
| 5,250,789 | 10/1993 | Johnsen . |
| 5,329,589 | 7/1994 | Fraser et al. ............................ 395/218 |

OTHER PUBLICATIONS

"Service Launches National Promo For Computerized Gift Registry", Arthur Markowitz, Discount Store News, Feb. 4, 1991.*

"Merchandising Bridal Registry—75 Years of Bridal Business", Doris Nixon, Gift & Decorative Accessories, May, 1992.*

"Bridal Business Booming Industry Courting Two–Career Couples", Gayle Young, et al; The Washington Post, 1985.*

"Computer Systems Can Enhance Bridal Business," author unknown, Gifts & Decorative Accessories, p. 42, 1989.* V90,N6.

"On Line At Dillards's" (Management Information Systems at Dillard's Department Stores) (Retailing Technology and Operations Supplement), Holly Haber, Women's Wear Daily, p. 5, 1989.*

"Wedding Information Network Completes Public Offering: Reports Yead–End Results", author unknown, PR Newswire, p. 2, 1987.*

"Scanning System Will Help Choose a Gift", Lynn Underwood, Star Tribune Newspaper of the Twin Cities, p. 08E, 1992.*

(List continued on next page.)

*Primary Examiner*—Donald E. McElheny, Jr.
*Attorney, Agent, or Firm*—Patterson & Keough, P.A.

[57] ABSTRACT

The present invention provides a system for registering items selected by a registrant from a plurality of participating merchants for subsequent communication to a prospective purchaser. The system has a computer system that contains identifying information about the registrant. A portable input and storage device is provided that can be carried by the registrant into a plurality of participating stores. The portable input and storage device is capable of receiving and storing information regarding gifts that the registrant desires to receive as presents. The input and storage device stores a unique identifier for the particular merchant each desired gift is from. A transfer device is provided connected to the computer system that receives the information regarding the registrant's desired gifts from the portable input and storage device and transfers the information to the computer system. Finally, a prospective purchaser interface device is provided that allows the prospective purchaser to view, sort or print a list of the gifts desired by the registrant and which particular merchant those gifts are from.

14 Claims, 20 Drawing Sheets

OTHER PUBLICATIONS

Famous Adding Jobs, Jim Gallagher, St. Louis Post–Dispatch, p. 1E, 1992.*

"Receiving Lines", Marge Colborn, The Detroit News, p. 15D, 1992.*

"75 Years of Bridal Business", (The Evolution of the Bridal Registry and the Future of the Wedding Gift Registry), Doris Nixon, Gifts & Decorative Accessories, p. 32, 1992. *

"The National Bridal Service at 40: Bringing Tableware Profits to Retail Jewelers," Hedda T. Schupak, Jewelers Circular Keystone, p. 54, 19.

"Building a Profitable Bridal Registry", Doris Nixon, Gifts & Decorative Accessories, p. 38, 1990.*

"Technology Comes to Tabletop," Ann–Margaret Kehoe, Home Furnishings Daily, May 24, 1993.*

Home Fashions Magazine, Jan,. 1993, p. 15.*

Carter Hawley Hale Stores, Inc., John Greitzer, p. 33.*

Chain Store Age Executive, Oct., 1992, "Here Comes the (New) Bridal Registry" pp. 58 &62.

LAURA J. SMITH
P. WILLIAM GEROM
WEDDING JUNE 12, 1993

REGISTRANT No.
12345567890
|||||||||||||||||||

| WANTED | REC'D | ITEM No. | CHECK | DESCRIPTION | UPC No. |
|---|---|---|---|---|---|
| 2 | 1 | 18 | [ ] | TOASTER | 3210987654 |

FIG. 9

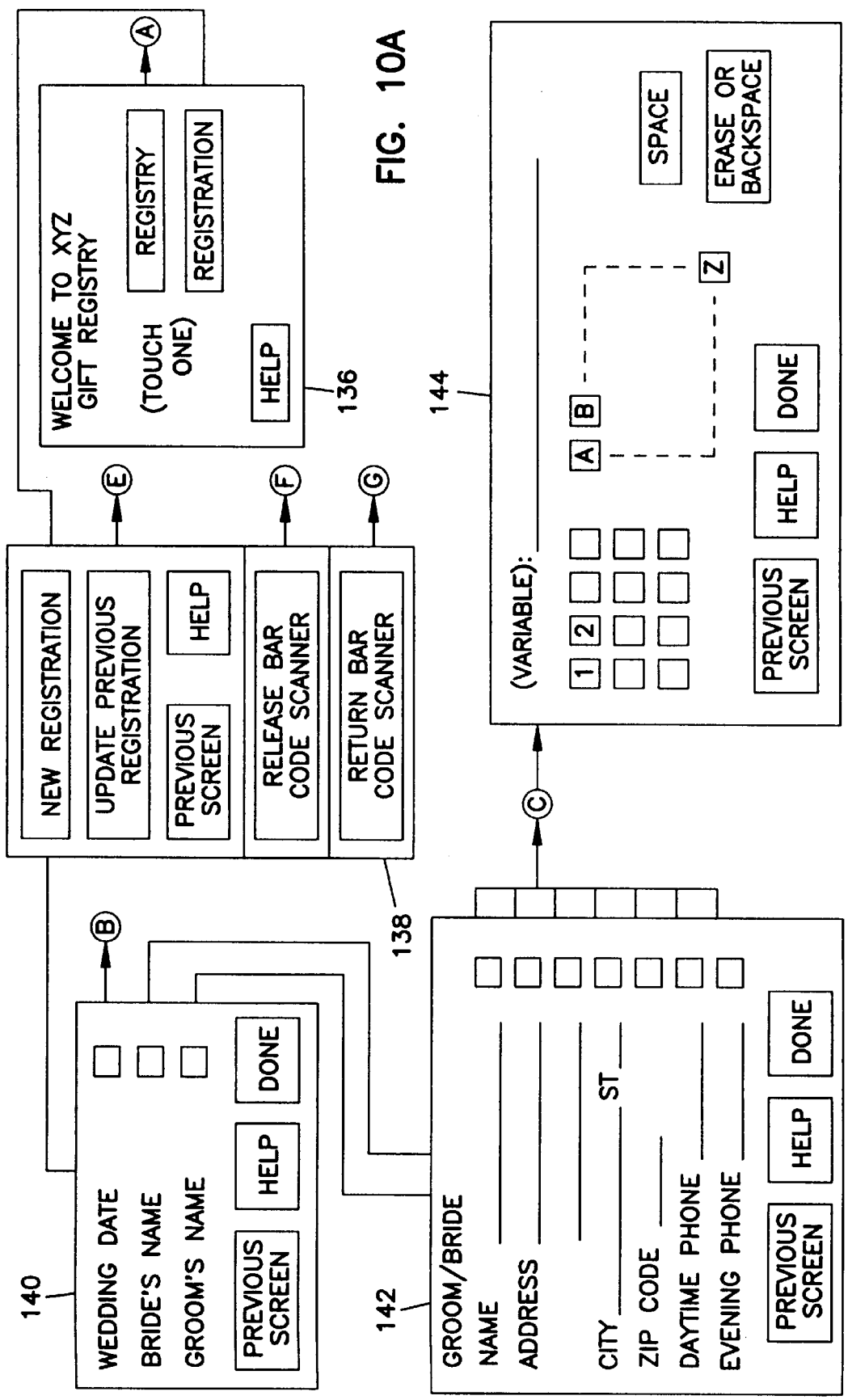

MULTI-MERCHANT GIFT REGISTRY

RELATED APPLICATIONS

This is a continuation-in-part of U.S. patent application Ser. No. 08/132,604, filed Oct. 6, 1993, entitled GIFT REGISTRY APPARATUS AND METHOD, abandoned, which itself was a continuation-in-part of application Ser. No. 08/062,470, filed May 14, 1993, abandoned. The present application is also related to Applicants' copending application entitled A METHOD AND APPARATUS FOR PROVIDING REGISTRY CARDS, filed on even date herewith and assigned to the assignee of the present invention, the disclosure of which is herein incorporated by reference.

FIELD OF THE INVENTION

The present invention relates to a gift registry system. In particular, the present invention relates to a multi-merchant gift registry system.

BACKGROUND OF THE INVENTION

Bridal registries are commonly known. Traditionally, in the United States, when a couple decides to marry, they will often go to particular stores and choose certain items which they would like to receive as gifts at their wedding. The particular store registers the name of the couple and the gifts that they have selected. The register is often nothing more than a log book. In recent times the registry has become a computer database that is available for interaction by a touch screen.

The current practice is to have a bridal registry or baby registry in a single store. Multiple stores in a shopping mall may each have their own registries. This requires the registrants to go through the registration process at each store where they wish to register. Additionally, potential purchasers must follow the current practice of entering certain information regarding the registrant via the interactive touch screen at each store where the registrant is registered. This then requires the potential purchasers to have to wait in line to operate the registry and get printouts at each of the multiple stores.

Currently, it is only the larger stores that can afford to have the equipment to operate an automated self service gift registry system. Consequently, many smaller stores and vendors at which the bride and the groom or the parents of the child may wish to be registered are not able to have their own registry system. Additionally, potential purchasers may not like the store typically used for registries, or the potential purchasers may have coupons at other stores or have employee discounts at other stores. Finally, because other stores may have the same items that the registrants have registered for at a lower price than the store in which the registry is located, the registry at the first store often does not accurately reflect the gifts which have been purchased elsewhere.

While this kind of self-service gift registry system has met with tremendous acceptance in the marketplace, there is a continued need for a multi-merchant registry that allows registrants to register for goods from a multitude of merchants.

SUMMARY OF THE INVENTION

The present invention provides a system for registering items selected by a registrant from a plurality of participating merchants for subsequent communication to a prospective purchaser. The system has a computer system that contains identifying information about the registrant. A portable input and storage device is provided that can be carried by the registrant into a plurality of participating stores. The portable input and storage device is capable of receiving and storing information regarding gifts that the registrant desires to receive as presents. The input and storage device stores a unique identifier for the particular merchant each desired gift is from. A transfer device is provided connected to the computer system that receives the information regarding the registrant's desired gifts from the portable input and storage device and transfers the information to the computer system. Finally, a prospective purchaser interface device is provided that allows the prospective purchaser to view, sort or print a list of the gifts desired by the registrant and which particular merchant those gifts are from.

BRIEF DESCRIPTION OF THE DRAWINGS

FIG. 9 is an illustration of a representative printout for a purchaser user;

FIGS. 10A–G are a series of illustrations representing screen images that are displayed to a registrant user or a purchaser user;

DETAILED DESCRIPTION OF THE PREFERRED EMBODIMENTS

A gift registry apparatus will be described below. The apparatus will be described with specific reference to a wedding gift registry but it should be understood that it is equally applicable to a baby gift registry or birthday gift registry. Additionally, like elements in the figures are correspondingly identified with primed numerals.

At this time a general overview description of the preferred embodiment of the present invention will be given. This will be followed by a background description of a gift registry apparatus, as described in Ser. No. 08/132,604, abandoned. The present invention will then be described in greater detail in light of the previous discussions.

OVERVIEW OF PRESENT INVENTION

The present invention is designed such that a registrant, or first user, may register for gifts from multiple merchants as opposed to the current practice of only registering in a single store. The present invention will be described with reference to an enclosed shopping mall, but it should be noted that the gift registry apparatus could be located in a kiosk adjacent a strip mall, in the side of a wall of one of the buildings of the strip mall, or in a kiosk in its own small protective shelter similar to some automatic teller machines, adjacent a downtown shopping area or other like area.

Figure 13:
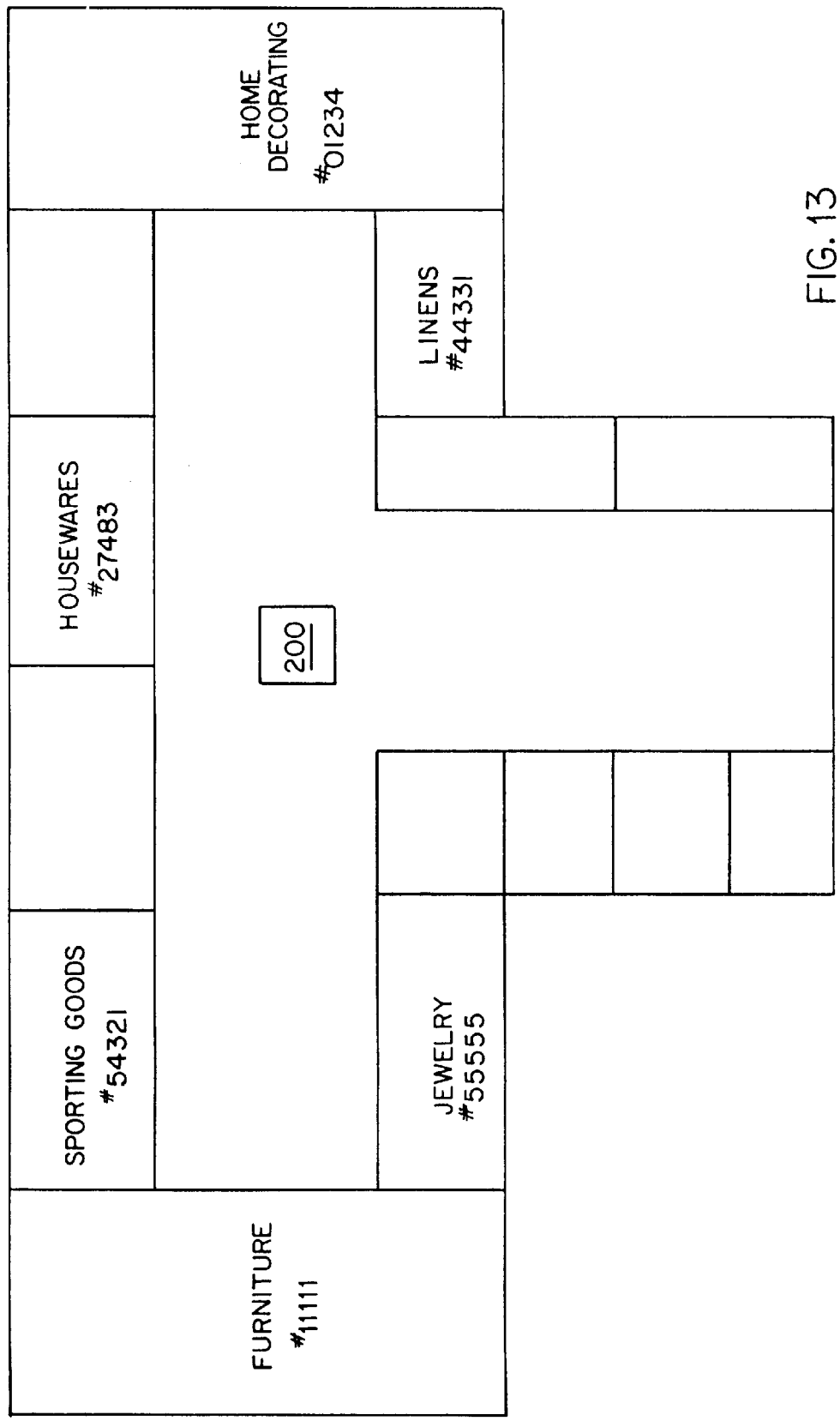
FIG. 13 is a top plan view of a shopping mall having a gift registry apparatus according to the present invention.

The present invention is illustrated schematically in FIG. 13. FIG. 13 is a top plan view of a shopping mall having a gift registry kiosk situated centrally in the mall. The gift registry system has a computer system that contains identifying information about the registrant. A portable input and storage device is provided that can be carried by the registrant into a plurality of participating stores. In the preferred embodiment of the present invention the portable input and storage device is a hand held scanning device. The portable input and storage device is capable of receiving and storing information regarding gifts that the registrant desires to receive as presents, as well as information necessary to identify the particular merchant which carries a desired gift.

The input and storage device stores a unique identifier for the particular merchant for each desired gift, as well as a unique identifier for the gift itself. The unique identifiers are preferably in the form of a bar code that is scanned in by the registrant for each merchant and each gift. A transfer device is provided connected to the computer system for receiving and transferring the information from the portable input and storage device regarding the registrant's desired gifts and the particular merchant those gifts are from. Finally, a prospective purchaser interface device is provided that allows the prospective purchaser to view a list of the gifts desired by the registrant and which particular merchant those gifts are from.

BACKGROUND DESCRIPTION OF A GIFT REGISTRY APPARATUS

Figure 1:
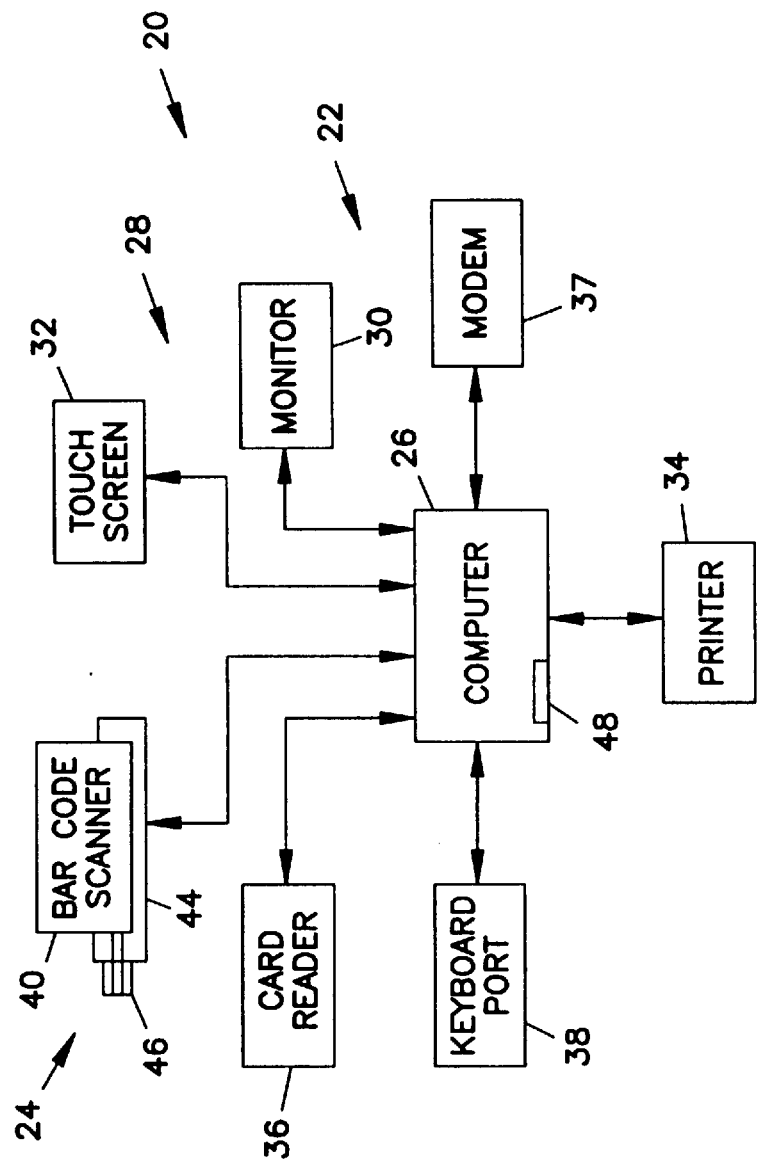
FIG. 1 is a block diagram representative of registry apparatus in accordance with the present invention.

A gift registry apparatus is designated generally by the numeral 20 in FIG. 1. Apparatus 20 is illustrated to include computer mechanism 22 and bar code scanning mechanism 24 for obtaining Universal Product Code (UPC) information about possible gift items. The UPC information allows the computer mechanism to categorize products or, in this case, potential gift items, so that a gift buyer can have the option of obtaining a list of gifts of a particular category.

The scanning mechanism 24 includes not only the bar code reading feature, but also a mechanism for transferring the information to computer mechanism 22. Bar code scanning mechanism 24 includes a bar code scanner 40 and may include a holder 44 with a locking mechanism 46 which unlocks only when a card reader 36 has appropriately read a magnetically encoded card, such as a credit card. Holder 44 may include a transfer device 45 which reads the memory of bar code scanning mechanism 24 for communication to a computer 26. The various electrical connections and locking/unlocking mechanism for use with the bar code scanning mechanism are conventional.

It is noted that scanning mechanism 24 is a key feature of an arrangement which may also include a card reader 36 which functions as a key to unlock scanning mechanism 24 as discussed in more detail hereinafter. Such arrangement allows the registrant (also called the first user) to browse among possible gift items to identify a group of the items which are desired as gifts. After registration is completed by a registrant, although a potential gift purchaser may not personally use the scanning mechanism 24 as a part of the arrangement which allows the potential gift purchaser to browse among the group of items selected by the registrant to identify a particular one of the group for purchase, it is likely that a store clerk will scan bar codes or otherwise obtain necessary information for transfer to computer mechanism 22 regarding items purchased.

Computer mechanism 22 includes a printer 34 and computer 26, as well as an interface mechanism 28 which comprises a monitor 30 and a touch screen 32. Computer mechanism 22 also includes software (not shown). Computer 26 preferably has a modem 37 for communication with a central processing mechanism as described more fully with respect to FIG. 4. Alternatively, modem 37 could connect to a network or to a mainframe. A keyboard port 38 is available on computer 26 to provide various servicing functions.

The software includes a first mechanism for receiving the first information about the registrant user and a second mechanism for receiving the second information about possible gift items. The software also includes a mechanism for associating the first and second information. In addition, the software includes a mechanism for obtaining the first and second information which has been associated together.

Computer mechanism 22 and bar code scanning mechanism 24 in conjunction with the software preferably further include a mechanism for verifying by the registrant that the items on which information has been entered are those desired by the registrant as a result of being able to review at least some of the information obtained from scanning the bar codes. The verifying mechanism includes a display mechanism 212 (see FIG. 11) which is a part of or mounted on the bar code scanner 40.

Figure 11:
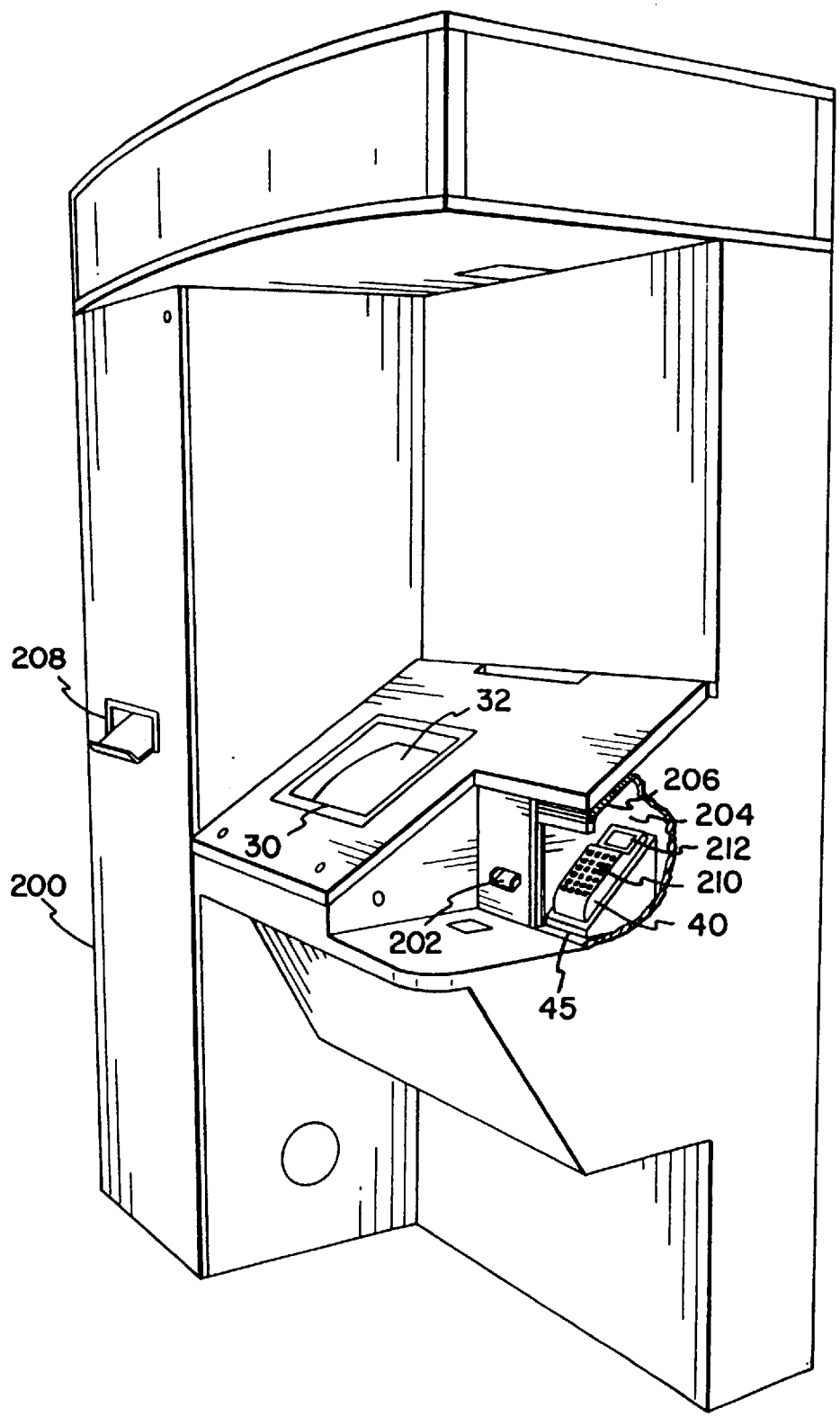
FIG. 11 is a perspective view of a kiosk housing usable in accordance with the present invention.

A kiosk representative of a housing 200 appropriate for containing the various mechanisms is depicted in FIG. 11. The computer terminal mechanism is not visible, but is contained within the housing. Monitor 30 with touch screen 32 is located approximately 3½ feet above the ground at an incline approximately perpendicular to the line of sight of a 5'8" person's eyes. An access opening 202 for card reader 36 (not shown) is provided. Bar code scanner 40 is held on a transfer device 45 in a compartment 204 having a sliding door 206. Preferably a sensor (not shown) would sense when bar code scanner 40 is physically present on the transfer device 45. Preferably, there would also be sensors (not shown) which would sense when door 206 is open and when door 206 is closed. The sensors would provide triggering signals with respect to screens appearing on the monitor to instruct the user. Appropriate sensors and sensing circuits are known by those skilled in the art.

Kiosk 200 is also useful for dispensing gift certificates. When functioning to dispense a gift certificate, the certificate is dispensed at opening 208. Likewise, printouts requested as part of the gift registry are also dispensed from opening 208. Thus, with the two functions possible using the same housing 200, it is possible to provide a reward in the form of a gift certificate to the gift registry registrant as an acknowledgement for using the apparatus. The gift certificate function is more fully explained in U.S. Pat. No. 5,243,174, herein incorporated by reference. Bar code scanner 40 is portable and preferably, although not required, includes a keyboard 210 and an LCD screen 212. The keyboard can be used to enter the identification number or an equivalent UPC number of a bar code which does not scan. The keyboard can also be used to enter purchase information after a purchaser makes a purchase. As indicated, the LCD screen is available for immediate verification that the correct bar code was scanned with respect to the item desired. An acceptable portable bar code scanner for this apparatus is Symbol Model LDT 3805. The particularly novel characteristic of apparatus 200 is that it allows the gift registry system to be a complete self-service system up to the point of purchase of a gift by the second user or gift buyer.

With respect to the gift registrant taking the portable bar code scanner to browse the store, a preferred form of security is that the registrant would provide a credit card to opening 202 to be read. Credit on the credit card account would be checked and a predetermined sum, for example $200, would be debited to the account before releasing the scanner. When the account was verified, credit found to be available, and the debit made, door 206 would either automatically open or, at least, would unlock and a prompt would appear on the monitor for the registrant to open the door and take the scanner. When door 206 was sensed to be open, another prompt could appear on the monitor for the registrant to take the bar code scanner 40. When it was sensed that the bar code scanner was no longer present, door 206 would automatically close and lock or the registrant would be prompted to close the door. After the registrant had completed use of the scanner 40, either an appropriate indication would be made on a menu at monitor 30 or the credit card could once again be inserted and read, whereupon appropriate menus would instruct the registrant to open door 206 and place scanner 40 properly on the charging stand and transfer device 45. The physical presence of scanner 40 would be sensed. An appropriate communication would be made between the terminal computer or the central processing computer and the scanner to verify that it was placed properly. Door 206 would then automatically close or a prompt would be given for the registrant to close the door. When the door was sensed to be closed, the credit card account would be credited an equal amount as the earlier debit, and the registrant would be informed of such action and thanked for registering gifts in the registry.

Alternatively, the portable bar code scanner is in the possession of the retail store. In this case, when a registrant wishes to register gifts in the registry apparatus, a store clerk requires, for example, cash, a credit card, driver's license, or something equivalent as security for giving the bar code scanner to the registrant user.

Figure 2:
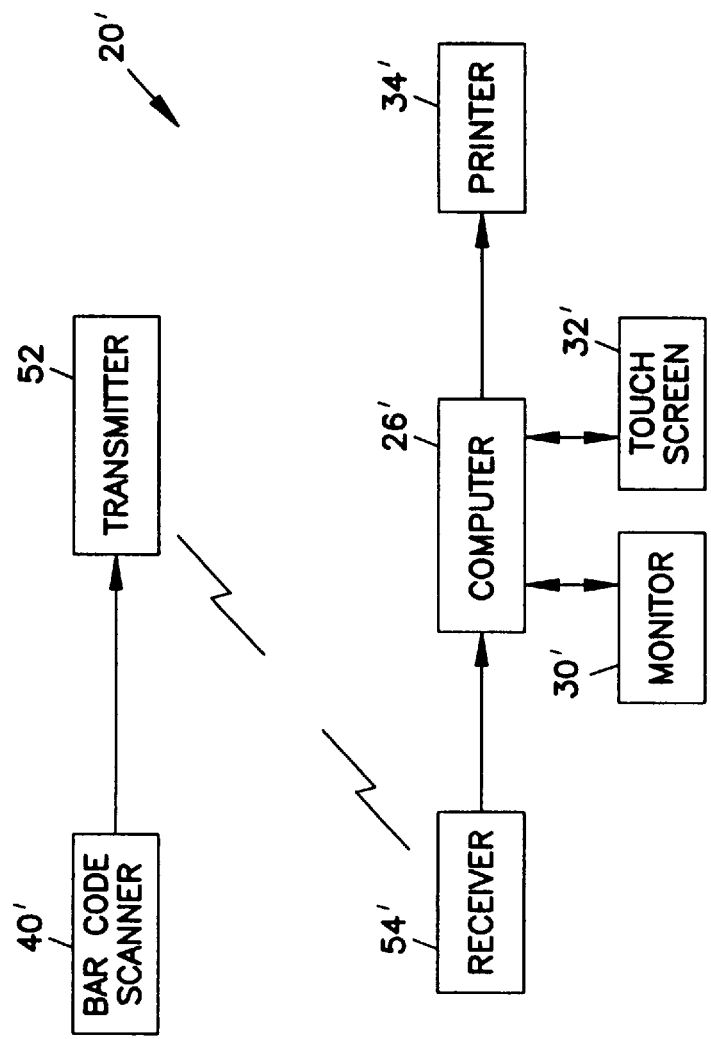
FIG. 2 is a block diagram representative of an alternate embodiment of registry apparatus in accordance with the present invention.

After the user has initiated apparatus 20 by entering first information on themselves in the computer, they walk around the store with the bar code scanner. Second information obtained from the bar codes scanned on the desired items, is communicated to the computer. In this regard, as shown in FIG. 2, bar code scanner 40' with memory/storage preferably includes a transmitter 52 which through radio, infrared, or other electromagnetic frequencies sends encoded information to receiver 54 for downloading to computer 26'. Other elements of apparatus 20' are similar to those of apparatus 20, for example, printer 34', monitor 30' and touch screen 32'. Alternatively, the communication mechanism could be removable storage media 42, for example, a commonly known floppy disk, which could be removed from the scanner and inserted in retrieving mechanism 48 in the computer, such as the usual floppy disk receiving slot and related mechanism.

Figure 3:
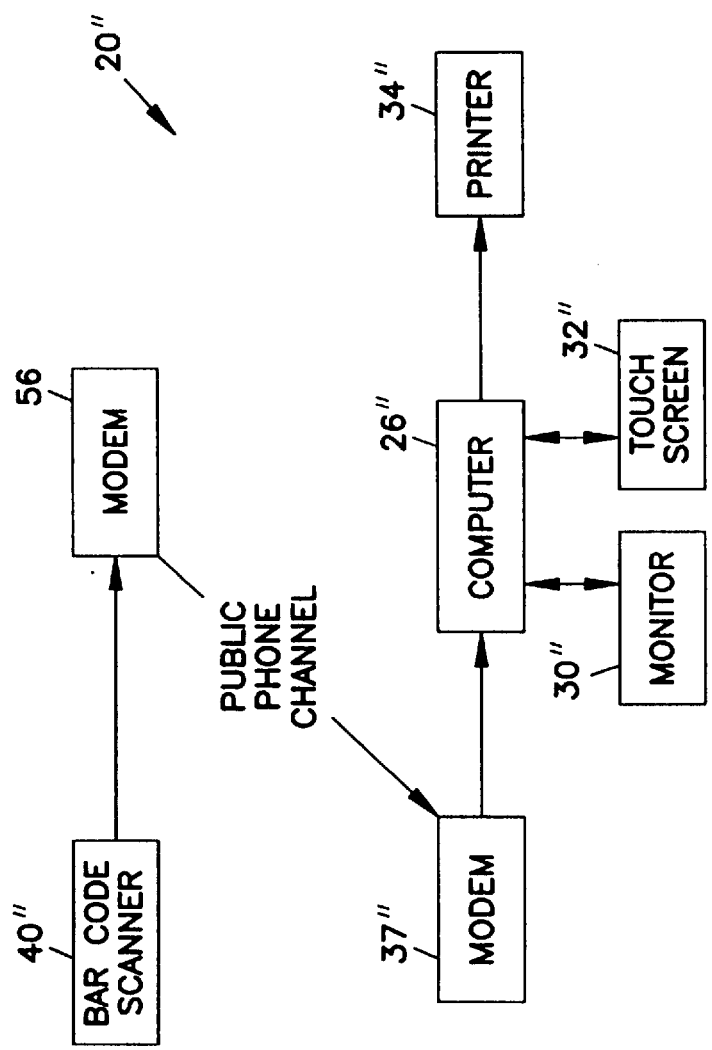
FIG. 3 is a block diagram representative of a second alternate embodiment of registry apparatus in accordance with the present invention.

A further alternative is shown in FIG. 3. Bar code scanner 40" includes a modem 56 or is connected to a modem as part of a transfer device (like 45). Modem 56, in a conventional fashion, connects through a public telephone channel to modem 37" of computer 26". Apparatus 20" is also likely to include some or all of the other elements of apparatus 20, such as printer 34", monitor 30", and touch screen 32".

Apparatus 20" is an interesting embodiment in that conceivably bar code scanner 40" could be located in the first user's home. Appropriate first information on the user could be entered into computer 26" in various ways, such as through a home personal computer with a modem connection to the store computer, by orally giving the first information over the telephone to a person entering it into the store computer 26", or by the first user entering the first information into computer 26" when the first user registrant is visiting the store. In any case, the store could send a catalog to perspective users. The catalog, as well as showing various items available, could include bar codes for those items. In that way, the bar code scanner could be used to scan bar codes of interest in order to enter appropriate second information as indicated via apparatus 20". The second information would be sent to computer 26" via the connection which can be made between the modems. Likewise, a shopper second user could select a gift from the catalog and communicate appropriate information, including the second information obtained from scanning the bar code, via the connection between the modems. In the usual way that business is conducted with respect to catalog sales, the gift item would be sent to the shopper second user.

In the preferred of these various embodiments, with reference to FIG. 1, computer 26 is an IBM PC or compatible computer with at least 2 megabytes of dynamic memory. Monitor 12 is a standard Super VGA Monitor capable of displaying 640×480 pixels at 256 colors per pixel. Touch screen 14 is an Elographics Intellitouch model 4001 Surface Acoustic Wave Touch Screen with Touch Screen Controller. Card reader 16 is a Magtek Swipe M%211232 magnetic card reader connected to computer 26 through an RS232 line. Laser printer 36 is a Canon LBP4 laser printer. Modem 42 is a 9600 Baud Multitec 10 Model MT 1432 error correcting modem. Bar code scanner 40 is a Symbol model 3805.

Holder 44 functioning as a transfer device is a Symbol CBM 38bb Cradle Base Module. In the embodiment of FIG. 2, transmitter 52 is a Symbol model LRT3805, while receiver 54 is a Symbol Spectrum 1 radio frequency network. All these items are commercially available as is known to those skilled in the art.

Figure 4:
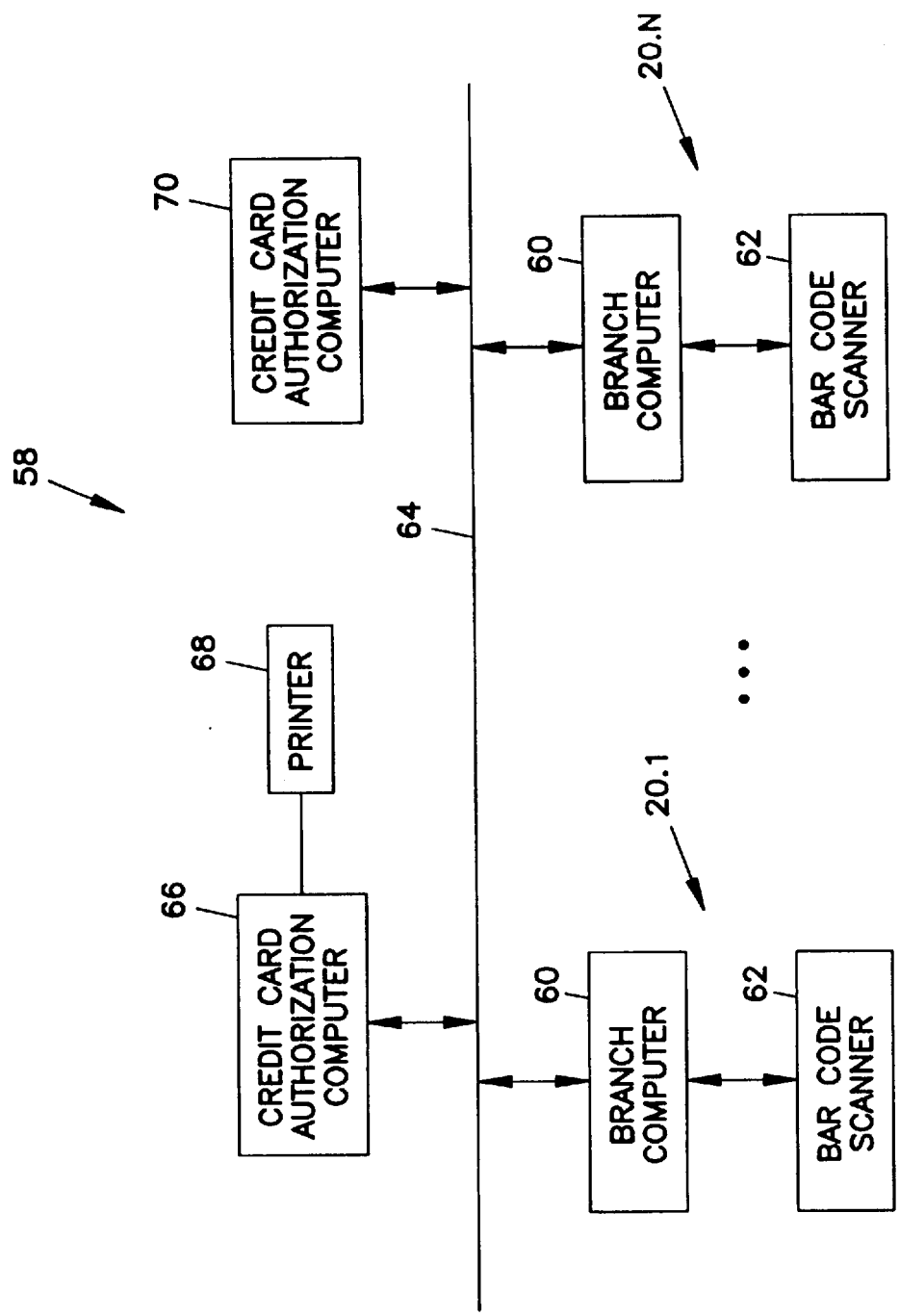
FIG. 4 is a block diagram representative of a registry network system in accordance with the present invention.

Gift registry apparatus 20 operates independently as shown in FIGS. 1–3, or within a network as shown in FIG. 4. Network 58 provides for numerous apparatuses 20 depicted in the form of branch computers 60 with bar code scanners 62. Apparatuses 20.1 through 20.N are connected as known to those skilled in the art through public telecommunications channel 64 to a central processing computer 66. Alternatively, they could be connected to central processing computer through a Local Area Network (LAN) or Wide Area Network (WAN). Central processing computer 66 is connected to a printer 68 for printing various transactions, as desired. In a preferred embodiment, central processing computer 66 could be a PC compatible computer and printer 68 is a laser printer of the type indicated hereinbefore. With a network 58, the registrant first user can input first and second information in any of the fashions indicated with respect to any of the terminal computer mechanisms 20.1 to 20.N. The association of the first and second information can take place in a particular computer mechanism 20.N or it can take place in the central processing computer 66. Regardless of where the association occurs, the associated information is stored in the memory or available storage of central processing computer 66. In that way, any one of computing mechanisms 20.N can be accessed by a second user in order to obtain the associated first and second information as desired.

It is noted that network 58 can also access a credit card authorization computer 70 in a known fashion through public telephone channels 64. This may be desirable to validate particular registrants, and as indicated, is useful in debiting an account as security for the bar code scanner with a subsequent credit when the scanner is returned.

Figure 5:
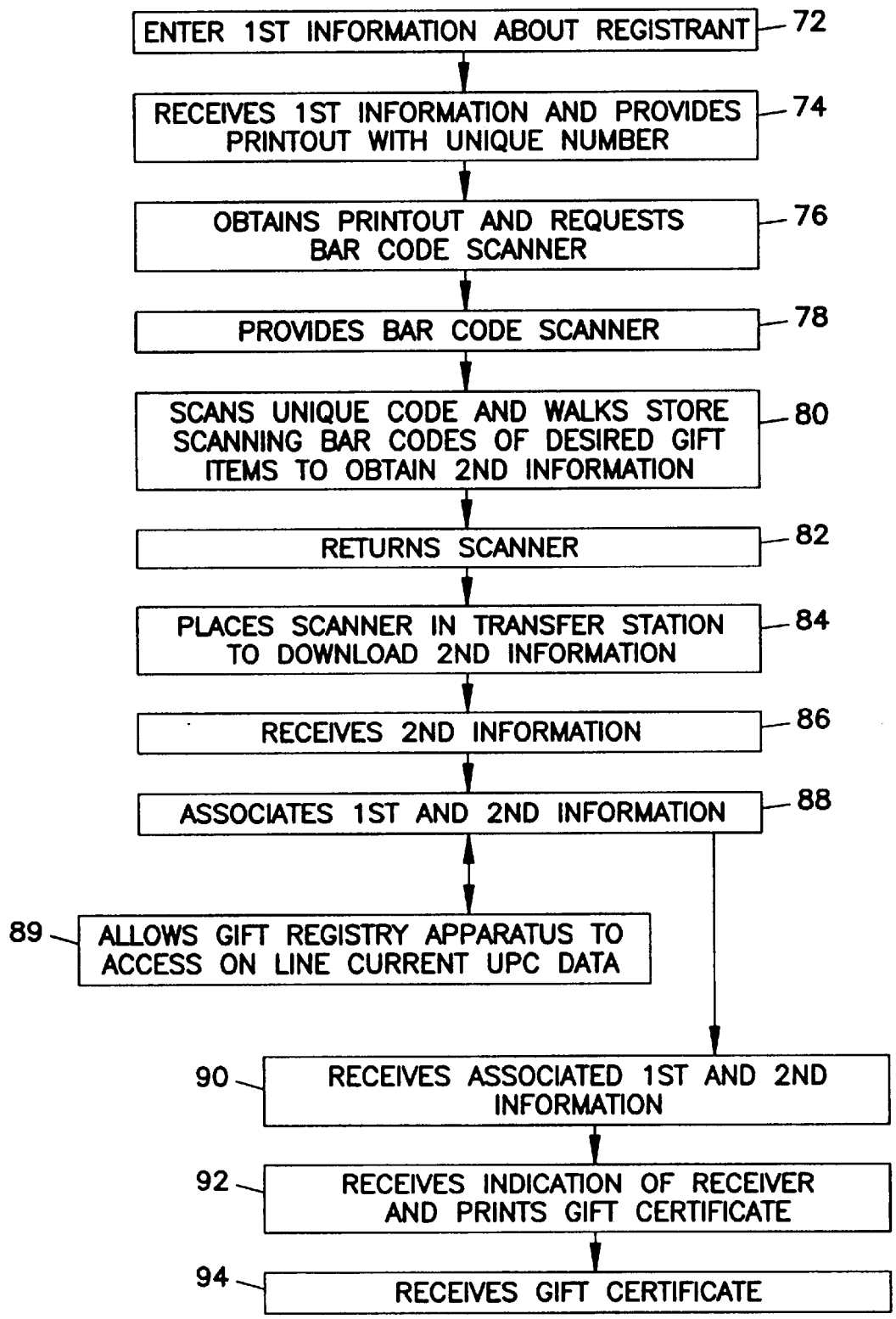
FIG. 5 is a flow chart representation of the steps taken by a registrant user of the registry apparatus in accordance with the present invention.
Figure 6:
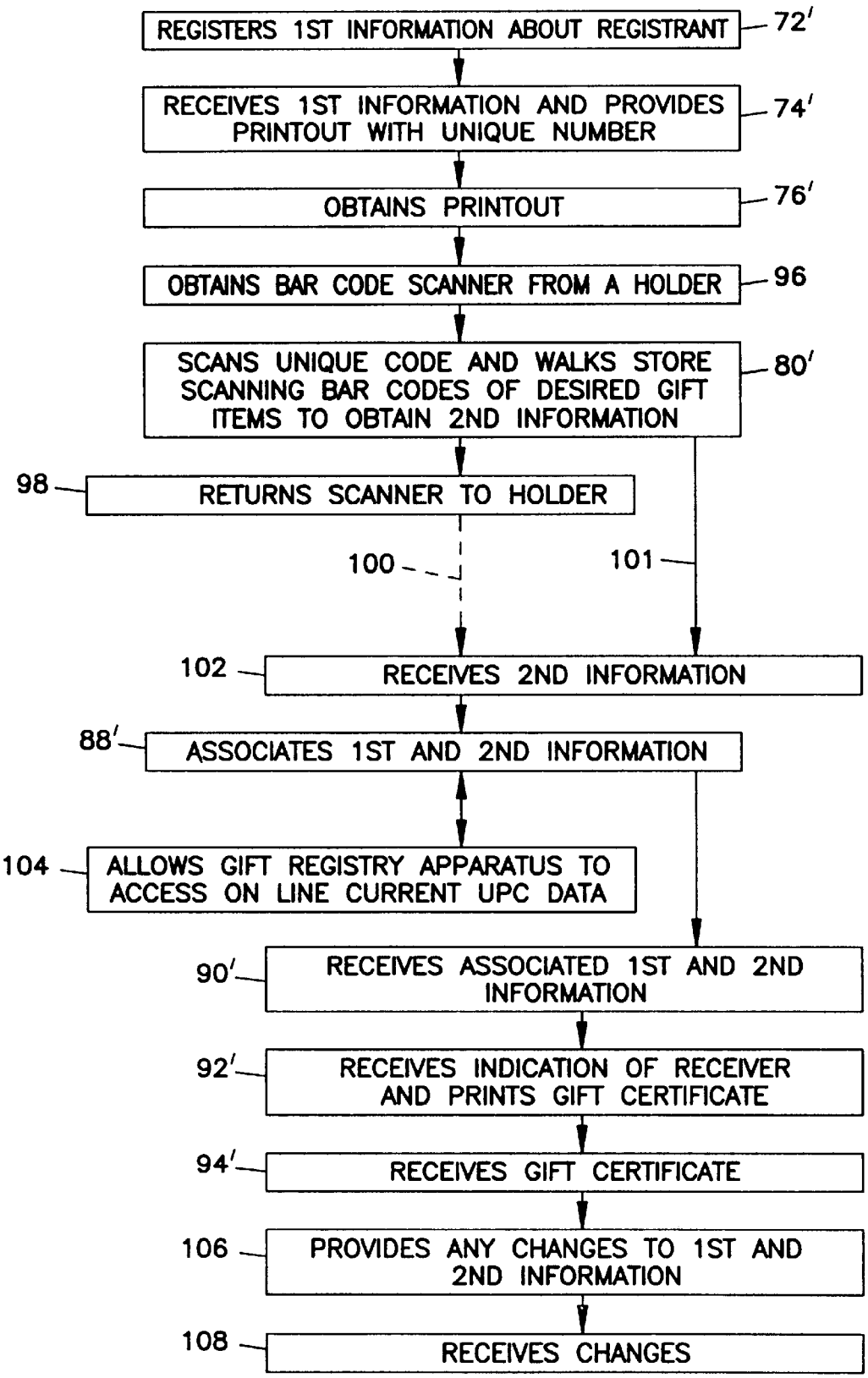
FIG. 6 is a flow chart representation similar to FIG. 5 of an alternate embodiment of the steps which may be taken by a registrant user.

Flow charts depicting a registrant user's use of the gift registry apparatus are shown in FIGS. 5 and 6. With reference to FIG. 5, the registrant approaches the gift registry apparatus and as indicated at box 72, the registrants enter first information about themselves. The gift registry apparatus as indicated at box 74 receives the first information and provides either on the monitor or by printout a unique identification number and a password for the particular registrant. Alternatively, the registrant could be given an option of providing a password. The identification number enables association of first and second information. The password is needed so that the information contained in the registry apparatus which is relevant to the particular registrant can only be modified by someone who knows the password. Accumulated information can be accessed by any potential gift giver who simply knows the name of the registrant.

As indicated at box 76, the registrant obtains the identification number and password and requests the bar code scanner. In the presently discussed embodiment, the store retains control of the bar code scanner, so that as indicated at box 78, it is the store which provides the bar code scanner to the registrant upon request. As indicated at box 80, the registrant then scans the identification number in the form of a unique bar code and walks about the store scanning bar codes of desired gift items to obtain second information. Alternatively, the identification number could be provided to the bar code scanner by the computer through the transfer device or could be manually entered at the scanner keyboard. When the registrant has completed scanning the bar codes of all the items which they may wish to receive as gifts, as indicated at box 82, the registrant returns the scanner to a store clerk. The store clerk, as indicated at box 84, places the scanner in the transfer device so that the second information can be downloaded to the computer. As indicated at box 86, the gift registry apparatus receives the second information and, as indicated at box 88, it associates the first and second information together. As indicated at box 89, the gift registry apparatus can be on-line to databases which include UPC data and current prices.

Figure 12A:
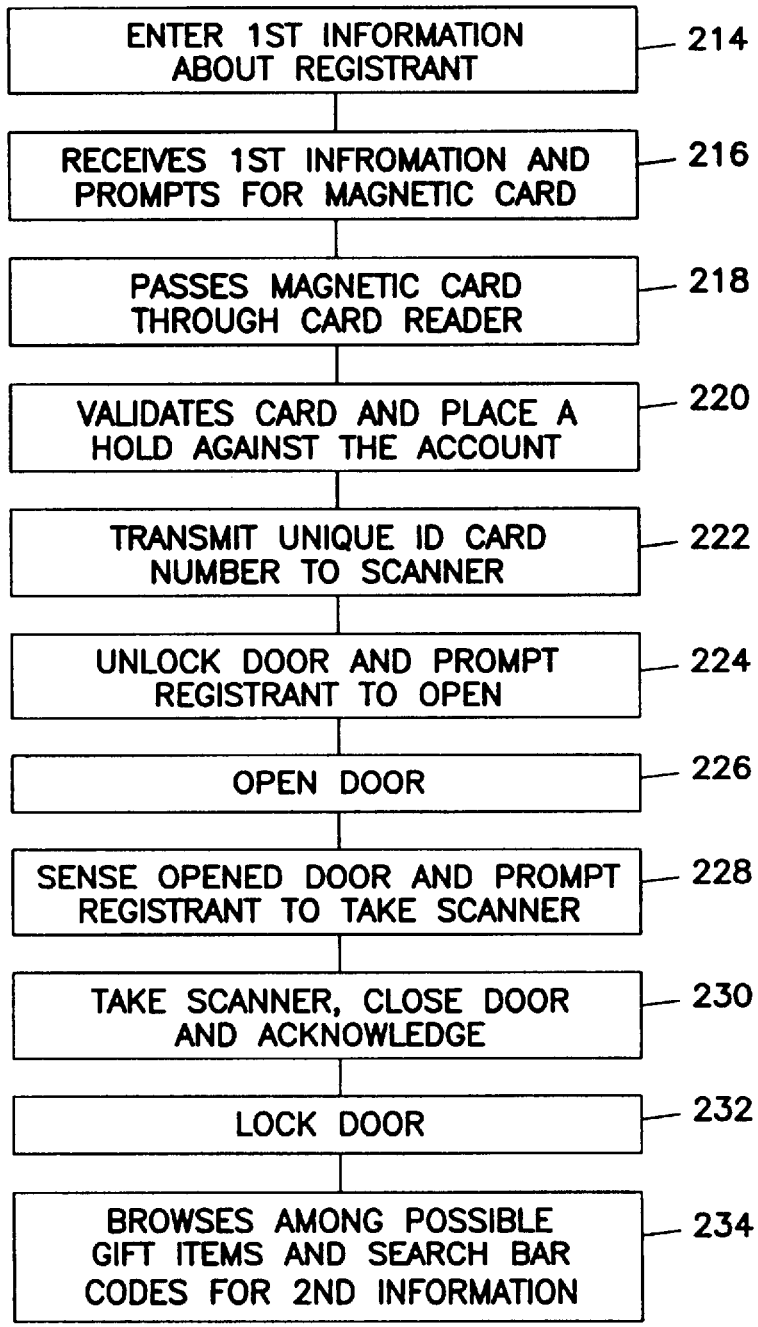
FIGS. 12A–B are a flow chart representation of steps taken by a registrant to obtain a portable bar code scanner from a housing like that shown in FIG. 11 and return it.
Figure 12B:
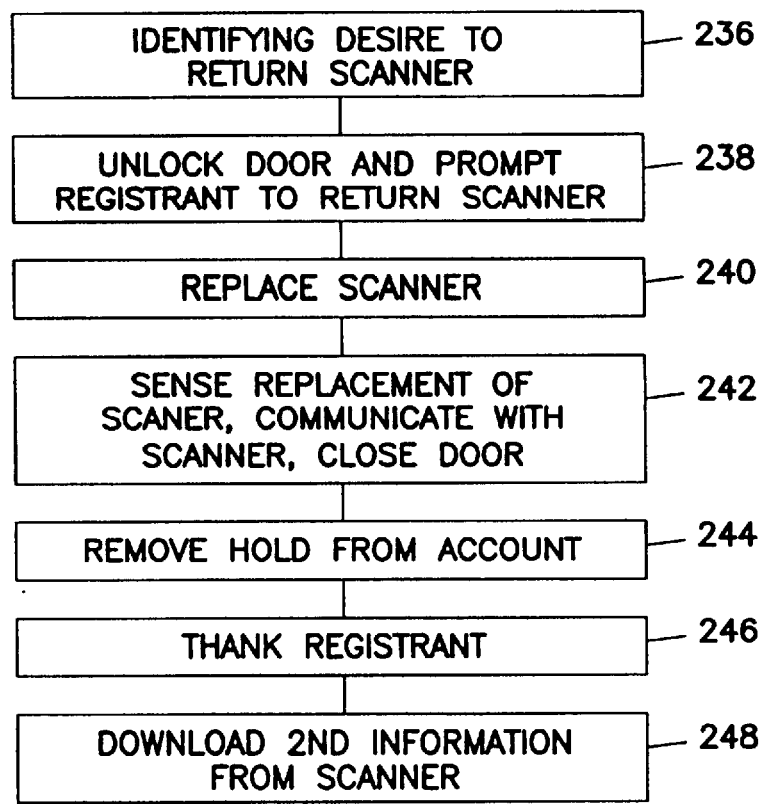

The flow charts of FIGS. 12A and 12B depict an alternative to the store providing the bar code scanner to the registrant (see also FIG. 11). Just as indicated at box 72 in FIG. 5, the first step, as indicated at box 214 is for the registrant to enter first information about themselves. As indicated at box 216, the first information is received by apparatus 20 and a prompt given for the registrant to supply a credit card or other appropriate unlocking mechanism. At box 218, the registrant passes the magnetic card through the card reader. At box 220, the account represented in the information read from the card is validated and, assuming that there is credit available, a hold is placed against a predetermined amount of credit as security for the bar code reader. In the preferred embodiment, as indicated at box 222, the unique identification number is transmitted to the bar code scanner. Then, at box 224, the door 206 is unlocked and registrant is prompted to open it. As indicated at box 226, the registrant opens the door. At box 228, apparatus 20 senses that the door is open and prompts registrant to take the scanner. As indicated at box 230, registrant takes the scanner, closes the door according to instructions, and acknowledges that the scanner has been taken. At box 232, the door is locked. At box 234, it is indicated that the registrant is then free to browse among possible gift items and scan bar codes for second information. The flow chart of FIG. 12A, as described, corresponds with the flow chart of FIG. 5 inclusive of boxes 72–80.

The flow chart depicted in FIG. 12B relates to the registrant returning the bar code scanner and having a credit placed against the debit which was earlier posted to the credit card account. As indicated at box 236, registrant first identifies or registers a desire to return the scanner. At box 238, the door 206 of compartment 204 is unlocked and the registrant is prompted to open the door and return scanner. Depending on the construction of housing 200, door 206 may automatically open and close as appropriate or there may be prompts for the registrant to physically open and close the door. At box 240, registrant replaces the scanner. At box 242, replacement of the scanner is sensed and apparatus 20 makes a communication with the scanner to insure that it has been properly placed for recharging and downloading of second information. The door is either automatically closed or a prompt is given to the registrant to close the door. At box 244, the hold that was placed against the credit card account is removed. At box 246, the registrant is thanked and monitor 30 reverts to the welcome screen. At box 248, apparatus 20 downloads the second information from the scanner to the appropriate computer for association with other accumulated information regarding that registrant. The flow chart of FIG. 12B corresponds with the inclusive boxes of 82–86 in FIG. 5. The subsequent portion of FIG. 5 is still appropriate. In that regard, rather than the monitor reverting to the welcome screen, it may allow the registrant to review the accumulated information for any changes. Based on the indicated method of FIGS. 12A and 12B, the computer terminal is programmed appropriately and present screens such as those shown in FIGS. 10F and 10G.

The procedure discussed thus far is sufficient for a useful gift registry system. With references to FIGS. 7 and 8, a gift buyer could now approach the system and obtain desired information as indicated in the flow charts of FIGS. 7 and 8. Nevertheless, there are further advantageous steps available. It is desirable, as indicated at box 90 of FIG. 5, that the registrant reviews the associated first and second information for correctness. If there is incorrect information or if the registrant wishes to delete certain information or enter new information, the apparatus may be again accessed by using the identification number and password and making appropriate changes. After the review and any changes have been made, the gift registry apparatus receives an indication from the registrant that the review has been made and completed. As indicated at box 92, it is then possible to optionally reward the registrant for taking the time and trouble to provide all this information to the gift registry apparatus of a particular store. The apparatus can be made capable to provide the reward to the registrant in the form of a store gift certificate, which may be pre-printed, or credit for a more general gift certificate selection as disclosed in U.S. Pat. No. 5,243,174. As indicated at box 94, the registrant receives the gift certificate and can thereafter redeem it in a usual fashion.

The flow chart of FIG. 6 has many similarities to that of FIG. 5, but there are also significant differences. As indicated at box 72', the registrant registers first information about themselves. As indicated at box 74', the gift registry apparatus receives the first information and provides the unique identification number. As indicated at box 76', the unique identification number is obtained. Then, as indicated at box 96, the registrant obtains the bar code scanner as otherwise indicated herein. The registrant, as indicated at box 80', then scans the unique identification number in bar code form and walks the store scanning bar codes of desired gift items to obtain second information. The registrant finally, as indicated at box 98, returns the bar code scanner to the holder so that, as indicated by broken line 100 leading to box 102, the second information can be transferred from the transfer mechanism of the holder to the gift registry apparatus. Alternatively, as indicated by solid line 101, the second information can be transmitted by radio frequency to the gift registry system and the bar code scanner then returned to its holder. As indicated at box 88', the apparatus associates the first and second information. As with the earlier described procedure, the present procedure could be ended with box 88'. As indicated in FIG. 6, however, there are further advantageous alternatives. The gift registry apparatus network can be in on-line communication to databases which include current Universal Product Code (UPC) data, as well as current prices. Such information when associated with the first and second information of the registry then allows the registry apparatus to categorize desired gift items by price or price range so that potential gift buyers can obtain price information or can obtain desired gifts of a certain price range. Additionally, the price information can be continually updated and, consequently, kept current with the information that is in the databases. The on-line communication is indicated at box 104. Additionally, as previously indicated immediate communication in conjunction with a bar code scanner having an LCD display 212 (see FIG. 11) can provide information on the display immediately after the bar code of a particular item has been scanned so that the user can verify from the information displayed whether the correct bar code was scanned and entered.

As with the procedure of FIG. 5, as indicated at box 90', it is also desirable to have the registrant review the associated first and second information, and perhaps price information. As indicated at box 92', the gift registry apparatus receives the review indication and prints or otherwise dispenses a gift certificate. As indicated at box 94', the registrant receives the gift certificate. In a somewhat different procedure than indicated with respect to FIG. 5, as indicated at box 106, the registrant could after receiving the gift certificate provide any changes to the first and second information so that as indicated at box 108, the gift registry apparatus would at that time receive the changes.

Figure 7:
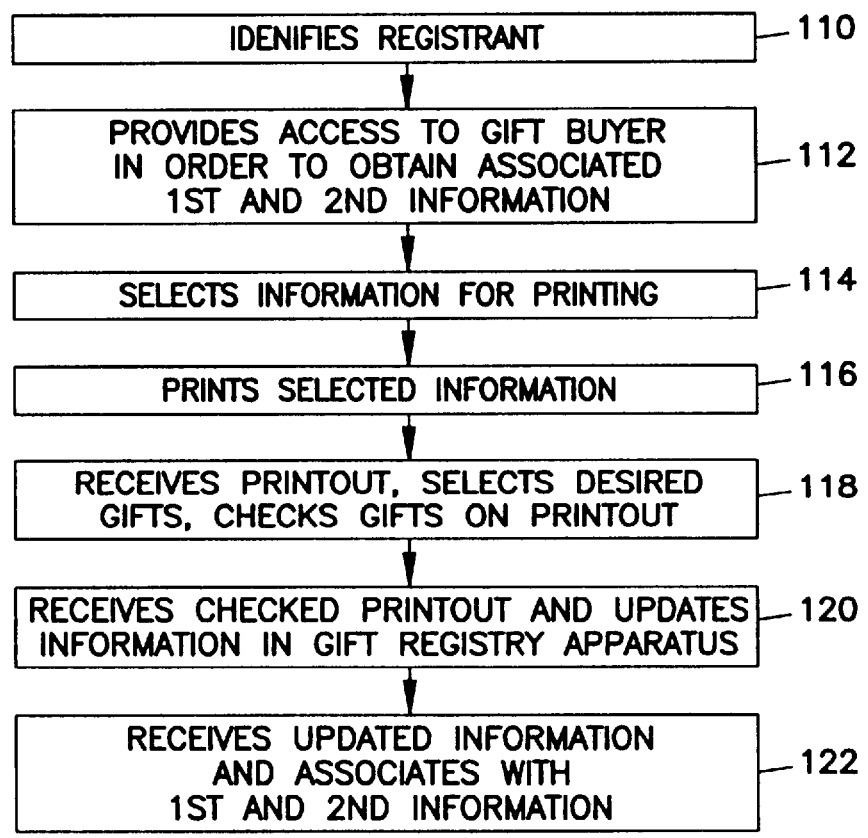
FIG. 7 is a flow chart representation of the steps taken by a purchaser user of the registry apparatus in accordance with the present invention.
Figure 8:
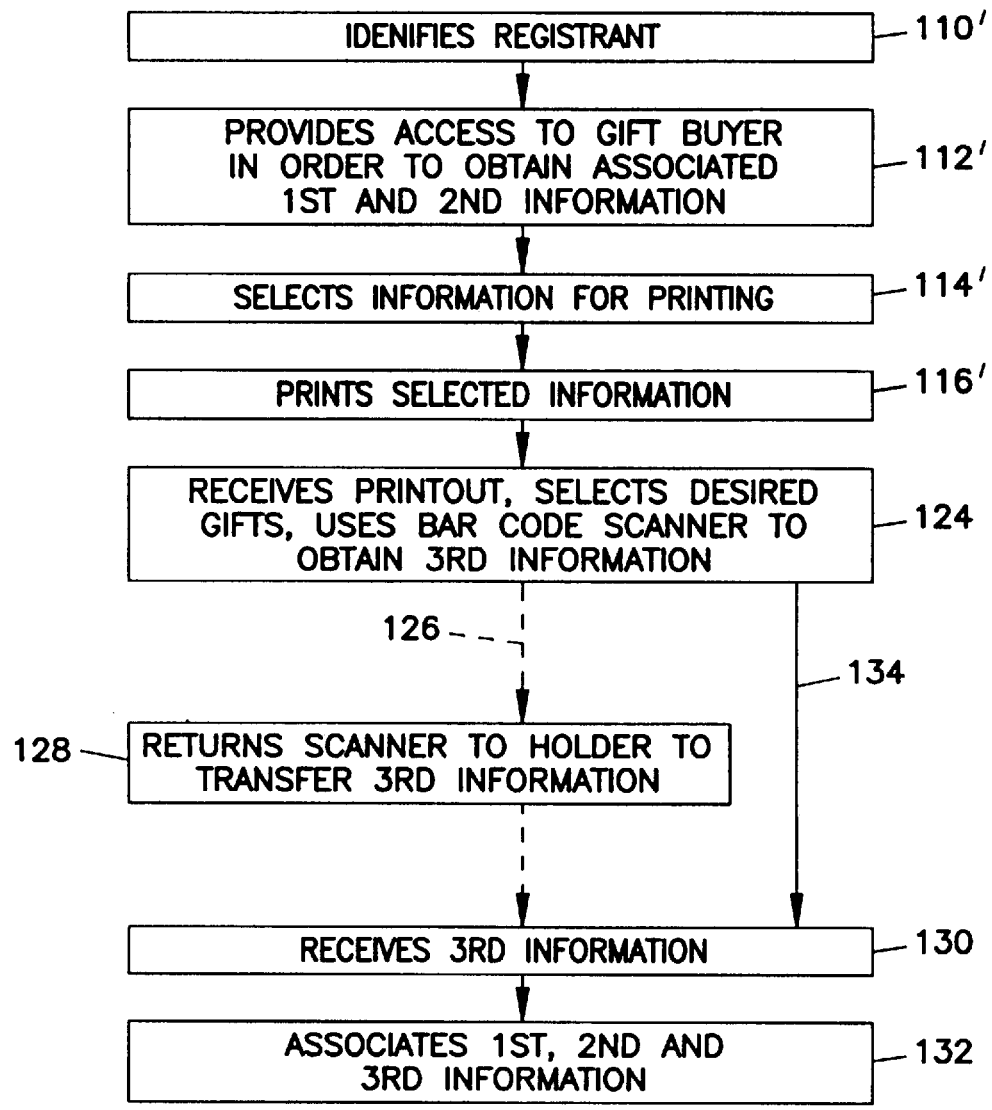
FIG. 8 is a flow chart representation of an alternate embodiment of the steps which may be taken by a purchaser user.

The procedure for using the gift registry apparatus which is followed by potential gift buyers is shown in FIGS. 7 and 8. With reference to FIG. 7, a gift buyer first approaches the gift registry apparatus, and as indicated at box 110, identifies the registrant. Identifying the registrant may be done using encoded registry cards, as disclosed in Applicant's co-pending application entitled "A Method and Apparatus for Providing Registry Cards", the disclosure of which has been incorporated herein by reference, or through a touch screen menu system as described above. There can be further verification steps, such as also identifying the wedding date or the future spouse's name. As indicated at box 112, the gift registry apparatus provides access to the gift buyer so that the gift buyer can obtain associated first and second information. As indicated at box 114, the gift buyer is given various menu options from which to select information for printing. As indicated at box 116, when an appropriate option has been selected, the gift registry apparatus prints the selected information. As indicated at box 118, the potential gift buyer receives the printout, walks the store and selects desired gifts, and then checks the gifts purchased on the printout or has the store clerk identify the gifts purchased so that, as indicated at box 120, the store clerk can update information in the gift registry apparatus. The update may be done at a terminal located in the store accessible to the clerk or could be located at a remote site wherein someone receiving the appropriate gift purchase information could do the update. In any case, as indicated at box 122, the gift registry apparatus receives the updated information and associates it with the first and second information.

A representative printout as referenced at box 118 is shown in FIG. 9. The printout indicates the names of the people getting married and their wedding date or other information such as the parents name and/or date of birth and/or the baby's name for baby showers. It further indicates the registrant identification number, which is the same as the number discussed hereinbefore. Then, the printout 119 preferably includes several columns, such as, the number of the particular gifts "wanted" and "received". The printout as shown also includes the item number of the particular gift as assigned by the gift registry apparatus relative to all the rest of the desired gifts by the registrant. In the example shown, the item number is eighteen. Then, preferably, there is a column providing a space wherein the gift buyer or the store clerk would indicate with a check mark or with a number, the fact of purchase or the number of items of that particular gift purchased by the gift buyer. There is preferably a description column and also a UPC number column. In any case, by using a printout of this general type, a physical record of items purchased can be maintained until someone can update the information in the gift registry apparatus to show that the particular gift has been purchased.

An alternative procedure is shown in FIG. 8. The gift buyer identified the registrant at box 110'. The gift registry apparatus, as shown at box 112' provides access to the gift buyer in order that the gift buyer can obtain associated first and second information. As shown at box 114', the gift buyer selects appropriate information for printing. As shown at box 116', the selected information is printed. As shown at box 124, the gift buyer receives the printout, selects desired gifts, and he/she or a store clerk uses a bar code scanner to scan bar codes of items purchased to obtain third information. In this regard, in an advanced system, the store clerk could use the same bar code scanning mechanism that is used in checking items at the purchase counter for payment. For example, there may be a code to enter or a button to touch which would initiate a software routine allowing receipt of the third information simultaneous with other use of the information with respect to check-out. The third information would be transferred as appropriate to the central computer of apparatus 20. To provide appropriate information, the identification number would be scanned or entered. Then the third information including the bar code or other identifying information of the item and the quantity of the particular item purchased is entered. Depending on the programming, the third information is then appropriately communicated and by using the identification number is associated with other accumulate information. As indicated at box 130, the gift registry apparatus receives the third information and, as indicated at box 132, the third information is associated with the first and second information.

Alternatively, the third information can be transmitted by radio frequency as discussed hereinbefore directly from the bar code scanner to the computer terminal and immediately associated with the first and second information. Such procedure is indicated by the solid arrow 134 extending from box 124 to box 130.

Gift registry apparatus 20 is programmed as known to those skilled in the art based on the representative screens of FIGS. 10A–G. Particular branch computers 60 (see FIG. 4) use a DOS operating system, are programmed with C++ program language, and make use of dBase database or SQL files for data storage. The central processing computer 66 uses an OS/2 operating system.

With reference to FIGS. 10A–G, as indicated at box 136, the first screen of the program welcomes a user to the "XYZ Gift Registry". The user is given the option of accessing the "registry" or proceeding with "registration". The instruction is given to touch one of the regions indicated.

Most screens include an option for the user to request "help" and will not be further discussed.

If the user touches "registration", then the screen represented by box 138 appears. The registrant user is given the opportunity to select between the options of "new registration", "update previous registration", "release bar code scanner", or "return bar code scanner".

Beginning with box 138, most screens in addition include the option of touching a region entitled "previous screen", which if touched, would result in the previous screen appearing so that the user could then proceed in accordance with the previous screen. Since this option is also available on most screens except the final processing and thank-you screens, it also will not be any further discussed.

If "new registration" is touched, control proceeds to screen 140. Screen 140 provides the registrant user the option of providing information relating to "wedding date", "bride's name", or "groom's name". If the bride's name or the groom's name is selected, control proceeds to the screen represented by box 142. It is understood that box 142 is representative with respect to different screens for the groom and for the bride as appropriate. In any case, the registrant user now has the option to provide information relating to name, address, city, state, zip code, day time phone and evening phone. When all the information has been provided, there is the additional option of touching the region identified by the word "done". In that way, control can proceed after all information is entered back to box 140. Depending on the item of information to be provided, control proceeds from box 142 to box 144 so that the appropriate information can be entered. The information to be entered is identified in the space marked "variable". As information is entered by depressing either numbers or letters, the appropriate information appears following the colon after the variable information. There may also be space and erase or backspace options. When all the information for the particular variable has been entered, the registrant user touches "done" and control returns to box 142. After the bride's name and the groom's name information has been entered or if the wedding date option is selected, control proceeds as indicated by a bubble "B" to box 146 shown in FIG. 10B. Again, the registrant user is presented with options for providing information, such as, wedding date, location, city, state, shower date number 1, and shower date number 2. Depending on the option selected, control either proceeds to box 148 or to box 144 as indicated by bubble "C". If control proceeds to box 144, then on the touching of "done", control will return to box 146. Assuming control proceeds to box 148, the variable "wedding month" is indicated and the option of the various 12 months is provided. When one of the months is touched, the month will appear following the colon. There is an option to touch "month not determined". After one of the months or the month not known option is touched, control proceeds to the screen represented by box 150. Alternatively, there is also the option to touch "done" whereupon, control returns to box 146. At the screen represented by box 150, the registrant user is shown the variable "wedding date" and is provided the option of touching dates ranging from one to the total number of days in the particular month of the wedding month previously selected. If a date has not yet been determined, that option is also provided. There is further the option to touch "done" whereupon control returns to box 146. If a date is provided or if the date not determined is touched, control proceeds to the screen represented by box 152. Box 152 displays the variable "wedding year" and the registrant user is given the option of selecting from among various years. After a year has been touched, control returns to box 146 as indicated by bubble "B". Additional information can be provided until all appropriate information is provided for box 146. At that point, the registrant user touches "done" and control will go to a screen (not shown) which thanks the registrant user for providing the information and can give as many instructions as are deemed desirable in order to teach the registrant user what to do next in completing the procedures of FIGS. 5 or 6.

Figure 10B:
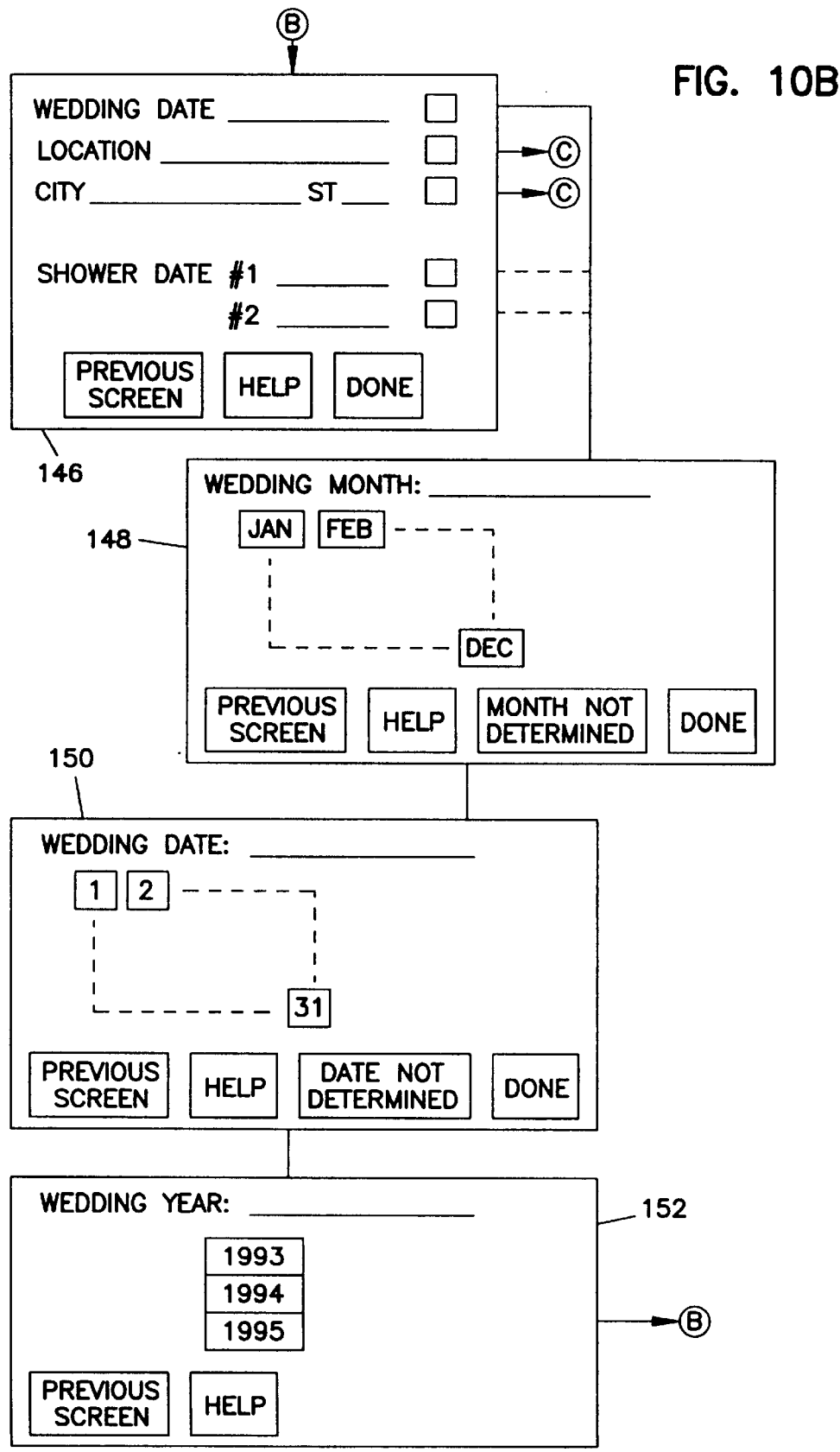
Figure 10C:
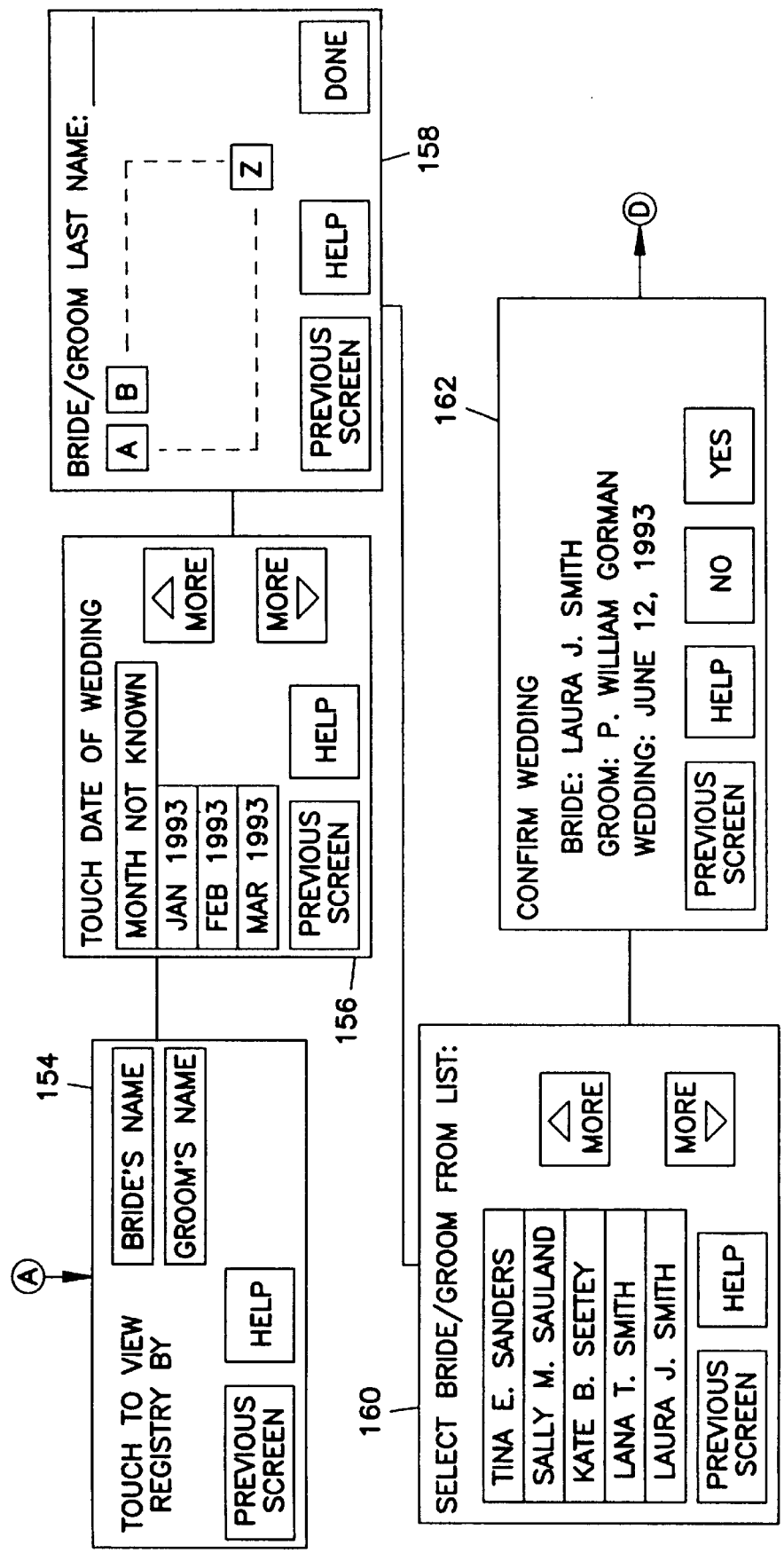
Figure 10D:
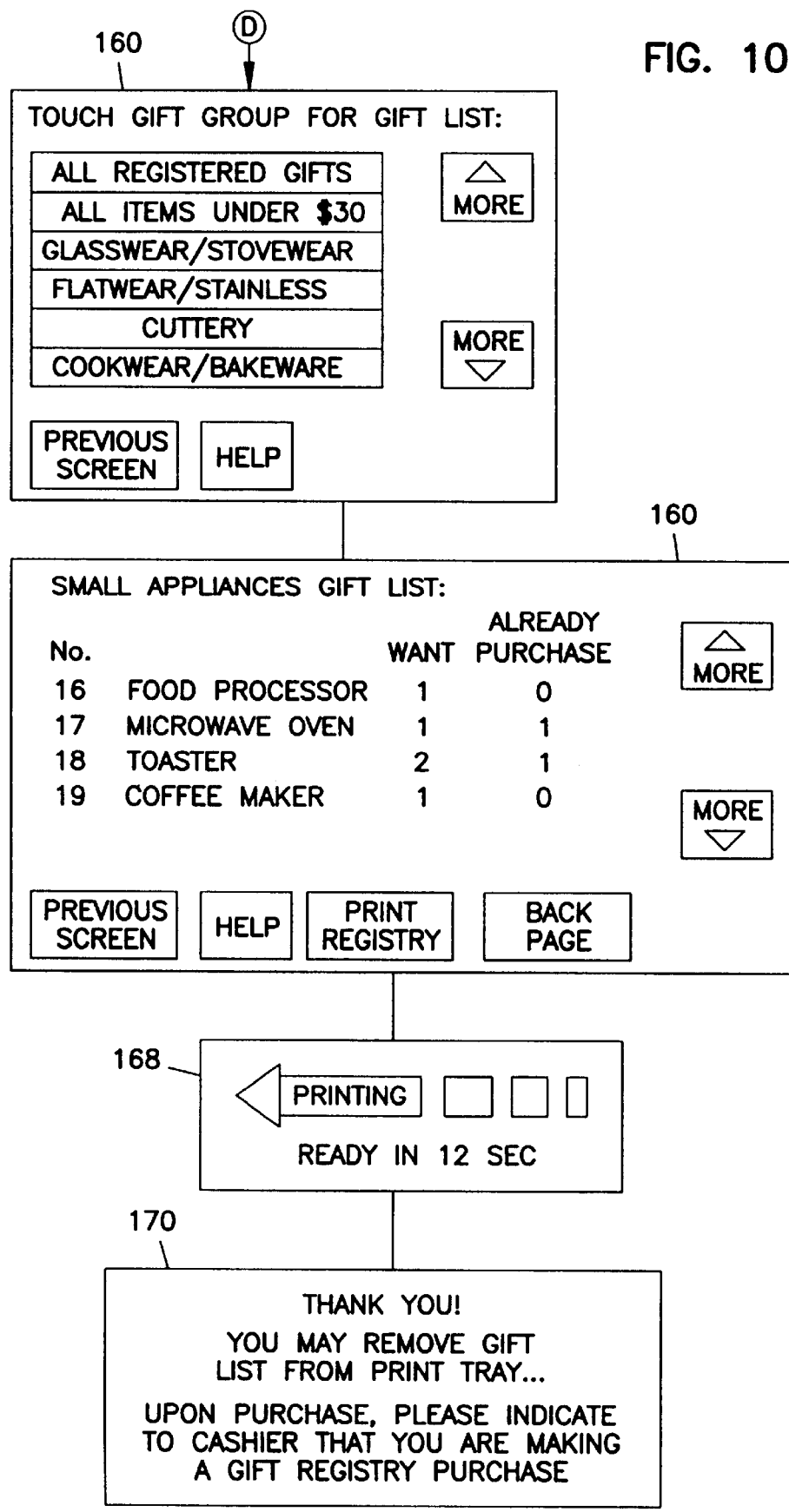
Figure 10E:
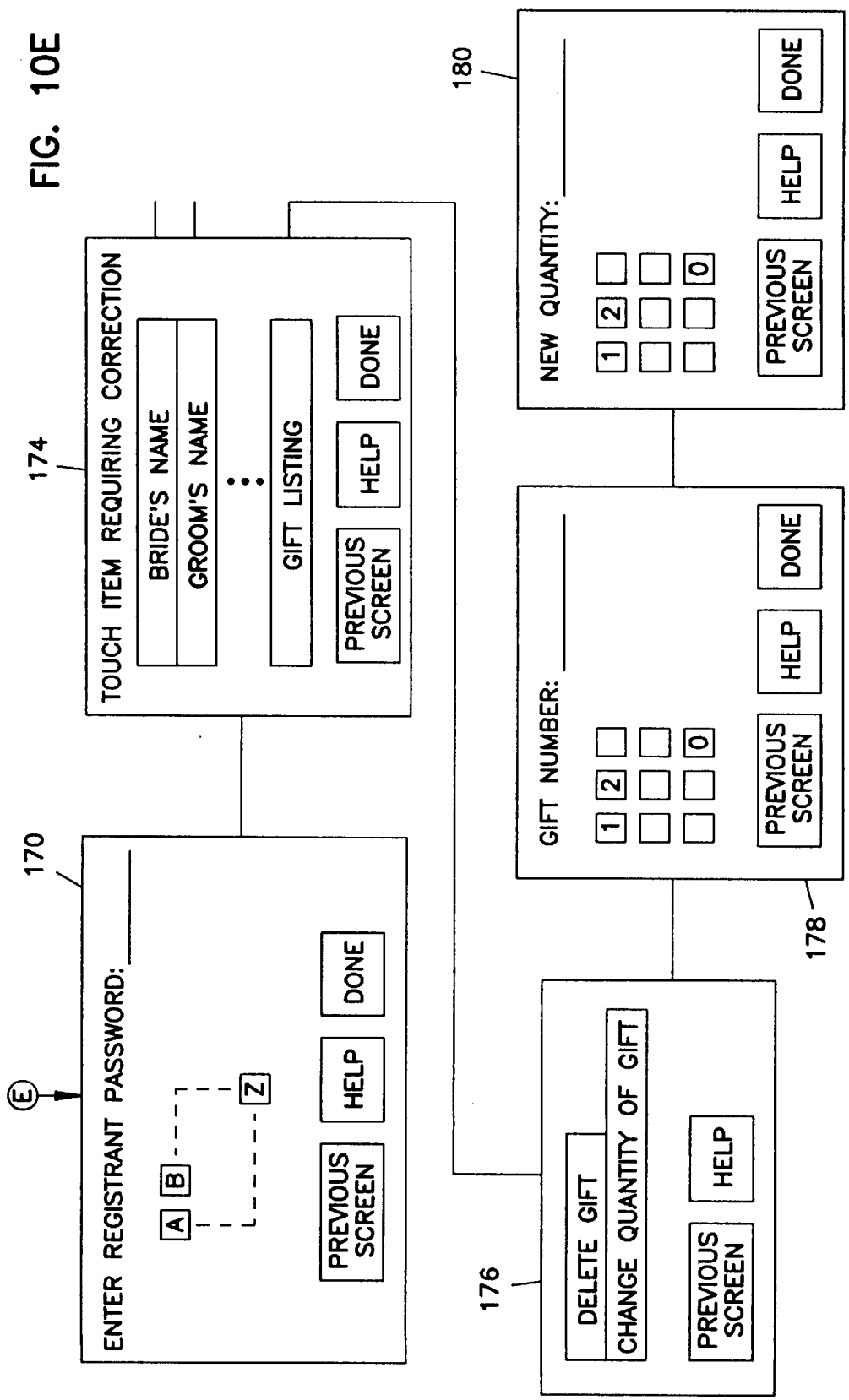
Figure 10F:
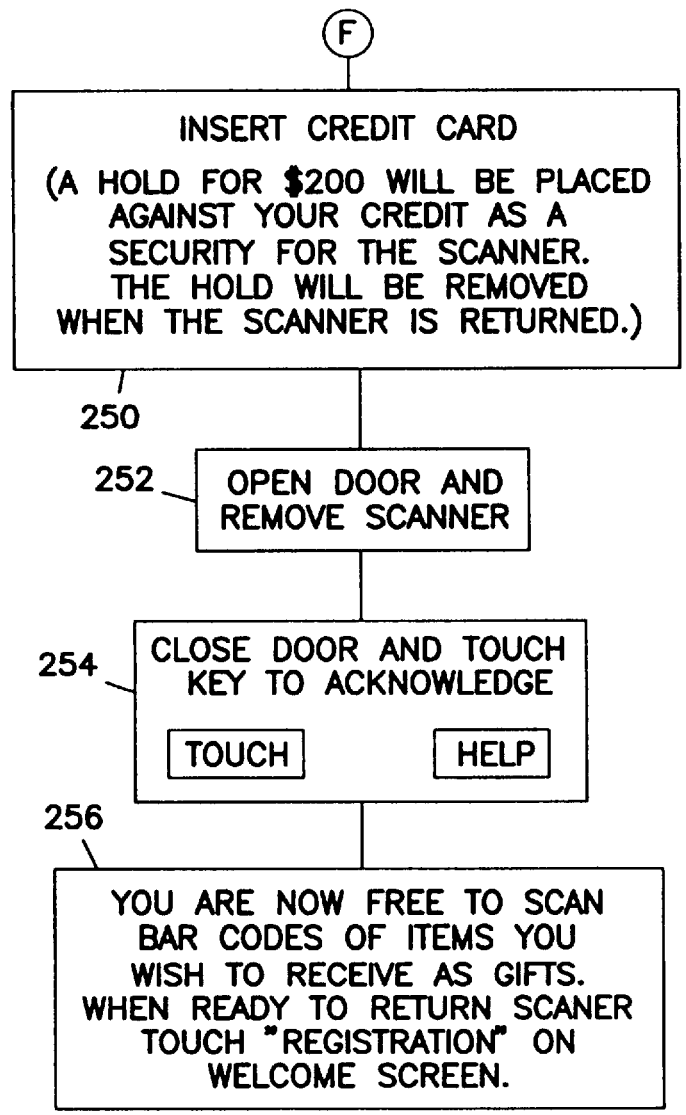
Figure 10G:
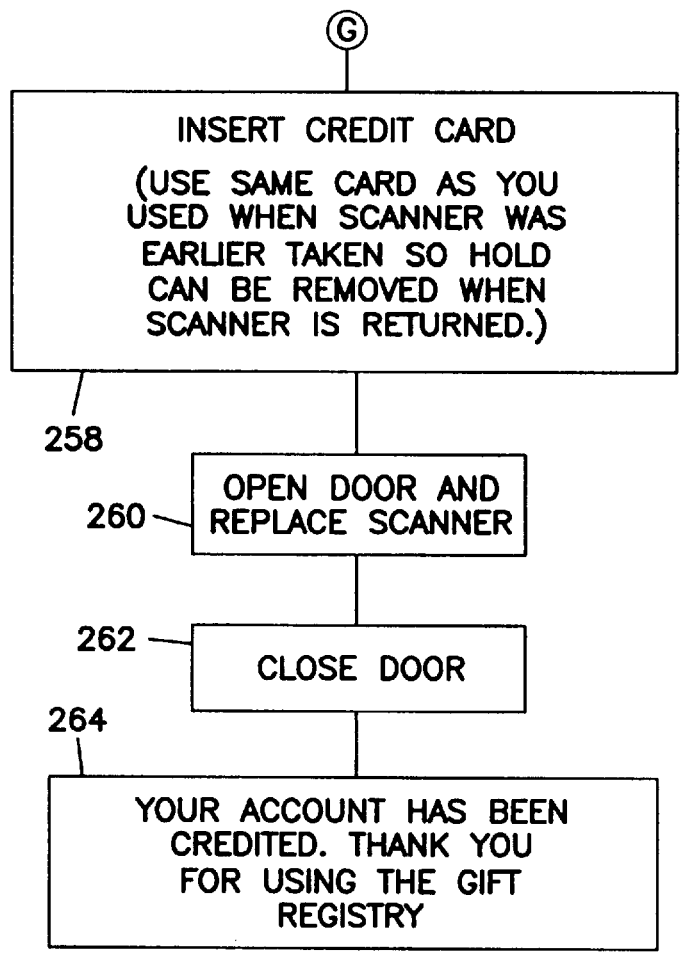

If the registrant at the screen represented by box 138 touches "update previous registration", then control proceeds as shown by bubble "E" to the screen represented by box 172 in FIG. 10E. Screen 172 requests the registrant's number and password and provides appropriate regions in which to touch letters or numbers until the entire registrant number and password is shown following the colon. At that point, the registrant touches "done" and, if the number and password are correct, control proceeds to the screen represented by box 174. If either is incorrect, a screen could appear which tells the user that the number or password is incorrect and that the user will be given another chance to enter them. At that point, screen 172 would reappear. If the incorrect number or password were entered again, control would revert to the welcome screen of box 136.

The screen represented by box 174 provides a series of options which identify items of information requiring correction. The registrant touches one of the items, and control proceeds to an appropriate screen such as might be found in FIGS. 10A or 10B. If the option selected is a "gift listing", then control would proceed to a screen like that of box 176. After all items requiring correction have been corrected, the registrant touches "done" and a screen thanking the registrant could appear before control reverts to the welcome screen of box 136. Additionally, there could be an intermediate screen which not only thanked the registrant, but explained that a gift certificate was being presented to them for completing the registration task. While the screen was available for viewing, the gift certificate could be printed or otherwise dispensed. Alternatively, a credit could be registered, and the registrant could be given a capability of accessing a gift certificate dispensing routine of the type disclosed in U.S. Pat. No. 5,243,174.

At box 176, the registrant is given the option to "delete gift" or "change quantity of gift". Regardless of which option is selected, control proceeds to the screen of box 178 where the appropriate gift number is entered. On completion of entry, "done" is touched. If the option was to delete the gift, control would then revert to box 174. If the option was to change quantity of gift, then control proceeds to the screen represented by box 180. At box 180, a new quantity for the gift is entered. Thereafter, "done" is touched and control reverts to box 174.

As indicated, after all information requiring correction has been corrected, "done" is touched at box 174 and control either immediately reverts to the welcome box 136 or does so after providing a gift certificate as discussed, depending on the option of the system.

If the user who approaches the gift registry apparatus touches "registry" on the first screen as represented by box 136, control proceeds as indicated at bubble "A" to box 154. The potential gift user is given the option to touch "bride's name" or "groom's name". Control then moves to screen 156 or alternatively to screen 158. The screen represented by box 156 provides the option of touching the date of the wedding. In addition, options to scroll to earlier or later dates is also provided. When a date has been touched, control proceeds to box 158 where the bride's or groom's last name is requested and an alphabet is provided so that letters can be touched and the name typed. When the name is completed, the user touches "done" and control proceeds to the screen represented by box 160. Since the last name has been provided in 158, box 160 provides a series of names in the registry which are identical to or similar to the name provided by the user. The user then has the ability to see the first name and perhaps a middle initial. The user can then more positively identify the name of the person who is presumably known to the user. The screen also provides the capability to scroll up or down so that more names can be viewed. After a name has been touched, control proceeds to the screen represented by box 162. Box 162 allows the user to confirm the wedding of interest by touching "yes" or "no". The box shows the name of the bride, the name of the groom, and the date of the wedding. If "no" is touched, control reverts to box 154. If "yes" is touched, control proceeds as indicated by a bubble "D" to box 164 shown in FIG. 10D. The screen represented by box 164 gives the potential gift giver user the option to select from among various classifications of gifts or all registered gifts or gifts having a certain price maximum or range or some other similar option. The screen also provides the option to scroll up or down to view more options. When a particular option has been touched, control proceeds to the screen represented by box 166. Box 166 shows the gift items desired by the registrant for the particular category selected. The screen preferably includes the number of a particular gift wanted and also the number already purchased. In that way, the potential gift giver can more knowledgeably select an appropriate gift. The screen also provides the ability to scroll up or down. The screen provides the user the option to touch "print registry" or "print page". If the print registry option is selected, all gifts in the registry for the particular registrant are printed. If the option to print the page is selected, then all gifts which can be accessed by scrolling up or down on that particular screen are printed. If the user does not want to print, the option "help" can be touched. A "help" routine is not provided herein, but could easily include the option to terminate use of the registry so that control would revert to the welcome screen represented by box 136. Assuming a print option is selected, control proceeds to a screen represented by box 168. Box 168 simply indicates the amount of time still needed to complete the printing job. Screen 168 requires no action on the part of the user, but rather is informational to the user. After the time has expired so that the printing is completed, control proceeds to the screen represented by box 170. Box 170 thanks the user and instructs her/him to take the printed gift list, use it and return it to a cashier when a purchase is made. Screen 170 remains visible for a predetermined time and then control reverts to the welcome screen represented by box 136.

In a case when a registrant has the capability of taking the bar code scanner from a kiosk housing, the registrant is greeted as indicated by the welcome screen 136. The registrant presses registration and screen 138 appears. If it is a new registration, the new registration portion of screen 138 is pressed and the various screens relating to registering as earlier described appear. Similarly, a registrant can update a previous registration. Of interest at the moment, is the self-service feature which allows the registrant to take the portable bar code scanner. With this in mind, the registrant presses "release bar code scanner". As indicated by the circle "F", the next screen is represented at box 250 in FIG. 10F. Screen 250 prompts the registrant to insert a credit card. It indicates that a debit will be placed against the credit card account as security for the scanner, but that a credit will be given when the scanner is returned. After that is done, at box 252, a screen is indicated to instruct the registrant to open the door and remove the scanner. At box 254, the registrant is instructed to closed the door and touch a key to acknowledge. At box 256, the monitor can provide whatever instructions are appropriate. The present screen simply indicates to the registrant that she/he/they are now free to scan bar codes of items which they wish to receive as gifts. They are given the further instruction on how to return the scanner and receive credit. As indicated with the circle "A", control then reverts to the welcome screen 136.

When the registrant is ready to return the scanner, the "registration" portion of welcome screen 136 is again touched. At screen 138, "return bar code scanner" is touched. Control then reverts as indicated at circle "G" to the representative screen shown in FIG. 10G. At box 258, the registrant is instructed to insert a credit card. The further instruction is given to use the same card as was used when the scanner was earlier taken so that the proper account can be credited for the scanner return. At box 260, the registrant is instructed to open the door and replace the scanner. After apparatus 20 senses that the scanner has been properly replaced, the registrant at box 262 is instructed to close the door. When the door is sensed to have been closed, at box 264, the registrant is told that the credit card account has been credited and is thanked for using the gift registry. Control then again reverts to the welcome screen.

It is understood that the various screens presented are representative and that more or less information may be provided. It is further understood that fewer or more options may be made available to the user in accordance with the previously disclosed procedures to provide the full capability contemplated by the system.

FURTHER DESCRIPTION OF THE PRESENT INVENTION

The present invention is illustrated schematically in FIG. 13. FIG. 13 is a top plan view of a shopping mall having a gift registry kiosk 200 situated centrally. The gift registry kiosk 200 is of the type previously described with reference to FIGS. 1–12. Accordingly, the same figures and element numbers will be used for the description of the present invention. In the preferred embodiment of the present invention, the specific components used are commercially available and are known to those skilled in the art. Examples of the specific components have been previously identified above. In addition to the description of the specific components previously described, other alternative arrangements of a gift registry kiosk 200 are also contemplated by the present invention. For example, instead of using the UPC code to identify desired gifts, any encoding scheme for entering a value representative of a particular item of merchandise could be used. In the case of the locking mechanism, it is possible to trigger the locking mechanism by the computer system instead of by a bar code swipe. It is also possible, for example, to accept in addition to credit cards, debit cards or even cash and then issue refund check to cover the deposit amount for checking out the scanner.

Each of the merchants which are participating in the gift registry system are identified by a reference number, as illustrated in FIG. 13. Preferably these merchants would identify themselves with identification signs in the windows of their stores, if they have stores, and also by identification signs on the kiosk 200 itself. Identification signs for each merchant may be placed, for instance, in signage area 301, as illustrated in FIG. 11.

The present invention will be described with particular reference to stores as opposed to merchants. The term store is used for ease of understanding the invention and for making the written text easier to read. It is understood that the present invention is equally applicable to vendors who do not have a "store". For instance, there are often times many merchants who have small booths, stands or kiosks in a shopping mall that are not actually stores, with four walls as people have come to use the term. Additionally, participating merchants may be only available through catalogs, as will be described below. These other merchants are understood to be included when the term store is used.

Bar code scanner 40, as previously described, is portable. This allows the registrant to carry scanner 40 from store to store. As the registrant enters a participating store, scanner 40 identifies which particular store the registrant is in by a unique store identifier code. This may be done by scanning in a bar code that is on the doorway of each participating store with scanner 40, it may be done by manually entering a code number for each store via key board 210 or it may be done remotely. For instance, each scanner may have a small receiver (not shown) inside it. As a registrant enters each participating store hey typically walk through a security system. This security system may be set up to transmit an identifying signal each time someone walks through the door. This identifying signal may be received by the receiver in scanner 40 and recorded. By recording a unique store identifier, the gift registry system will know which gifts come from which store.

Once the registrant has scanned in each gift that is desired from the participating stores, scanning device 40 is placed back in transfer device 45 which reads the memory of bar code scanning mechanism 24 for communication to computer 26. It would also be possible to have a transfer device in each store, such that when a registrant was about to leave a store, they would insert the scanner into transfer device 45 and download the gifts selected from that store. This information would then be remotely transmitted to the computer in kiosk 200. From this point on, the gift registry system operates the same as previously described, with the exception that when the information is printed out for a prospective purchaser, the particular store that each gift is located in will be printed out.

As previously stated with respect to the gift registry apparatus described above, bar code scanner 40 could be located in a registrant's home such that the registrant could register for items from multiple merchants via a catalogue that includes bar codes for the items. The registrant would communicate to the kiosk via remote communication, such as a modem or the InterNet. The term catalog should be understood to be not limited to a physical paper catalog, but also encompasses things such as CD-ROMs, and other data storage devices. In this embodiment, it would be required that there be a unique bar code for each catalog to identify the supplier of the particular item. This identifying code could be on the front cover, the back cover, or somewhere within the catalog.

In an alternative embodiment of the present invention, each particular merchant would assist in updating the information in computer 26 such that he computer keeps an accurate list of desired gifts for each particular registrant. This may be done in a number of ways. In one embodiment, the merchant would be in remote communication with the computer of kiosk 200 via modem 37. As the prospective purchaser buys a gift, the merchant would request the list of gifts generated by the gift registry system from the prospective purchaser. This list of gifts would have on it a bar code that represents a unique identification code for the particular registrant. The merchant would then scan in the identification code, and then scan in the goods being purchased. The list of goods for this particular registrant would then be updated accordingly in computer 26.

In another embodiment, similar to that just discussed, a merchant would simply ask for the gift list from the prospective purchaser as the merchant is ringing up the sale. The merchant would then manually mark which items and how many items were purchased on the list. At the end of the day, all of the merchants associated with the multi-merchant registry would deposit them with a system operator or in a slot 302 as seen in FIG. 11. The system operator would then update the lists of desired gifts for the registrants. It should be noted that these are only two examples of how computer 26 may be updated and many other methods of updating computer 26 may be utilized without departing from the spirit or scope of the present invention.

It is understood that equivalents are possible within the spirit of the present invention and that changes made from the present disclosure, to the full extent extended by the general meaning of the terms in which the appended claims are expressed, are understood to be within the principle of the invention.

What is claimed is:

1. A multi-merchant gift registry comprising:
    a gift registry kiosk disposed proximate the stores of a plurality of merchants in a shopping area, each of said merchants participating in the gift registry, the gift registry kiosk having;
        a first data entry system through which first information and inquiries about registrants in the gift registry are entered into the computer system, the first information for each registrant including at least one name for the registrant;
        a second data entry system capable of receiving second information, the second information including a list of potential gifts which the registrant has identified and a unique identifier associated with the particular merchant having each of the desired gifts;
    a database storage system that stores and retrieves the first and second information about the registrant and the unique identifier associated with the particular merchant having each of the desired gifts; and
    a display system that displays the list of potential gifts for a particular registrant and information about the particular merchants the desired gifts are from, including the unique identifier associated with the particular merchant having each of the desired gifts in response to an inquiry from a prospective purchaser.

2. The gift registry as in claim 1 wherein the first data entry system is a touch screen system.

3. The gift registry as in claim 1 wherein the second data entry system comprises a transfer device electrically connected to the computer system and a portable device.

4. The gift registry as in claim 3 wherein the portable device is a hand held scanning device.

5. The gift registry as in claim 4 wherein the transfer device is a docking station for the portable hand held scanning device.

6. The gift registry as in claim 1 wherein the second data entry system identifies each participating merchant by a unique identifier.

7. The gift registry as in claim 6 wherein the unique identifier is in the form of a digitally encoded value embodied in a bar code.

8. The gift registry as in claim 1 further comprising updating means for updating the database storage system as a prospective purchaser buys a gift from the list of potential gifts for a particular registrant.

9. A system for registering items selected by a registrant from a plurality of participating merchants for subsequent communication to a prospective purchaser, the system comprising:

a gift registry kiosk disposed proximate the stores of a plurality of merchants in a shopping area, each of said merchants participating in the gift registry, the gift registry kiosk having a computer system containing identifying information about a registrant, the information for each registrant including at least one name for the registrant and a list of potential gifts which the registrant has identified;

a portable input and storage device for use by the registrant with a plurality of participating merchants, the input and storage device being capable of receiving and storing information regarding the registrant's desired gifts including the merchant each desired gift is from, wherein the input and storage device stores a unique identifier for the particular merchant each desired gift is from;

a transfer device connected to the computer system that receives the information regarding the registrant's desired gifts from the portable input and storage device and transfers the information to the computer system; and a prospective purchaser interface device that allows a prospective purchaser to view a list of the goods desired by the registrant wherein the list includes information about the particular merchant each gift is from.

10. The gift registry as in claim 9 wherein the portable device is a hand held scanning device.

11. The gift registry as in claim 9 wherein the unique identifier is in the form of a digitally encoded value embodied in a bar code.

12. The gift registry as in claim 9 further comprising updating means for updating the database storage system as a prospective purchaser buys a gift from the list of potential gifts for a particular registrant.

13. A method of operating a gift registry system capable of registering items selected by a registrant from a plurality of participating merchants in a shopping area as possible gifts for the registrant for subsequent communication to a prospective purchaser for possible purchase as gifts for the registrant, the system having a computer system, a portable input and storage device, a transfer device and a prospective purchaser interface device, the method comprising the steps of:

receiving identifying information about a registrant at the computer system;

using the portable input and storage device to select desired gifts from a plurality of participating merchants;

using the portable input and storage device to enter a unique identifier for each participating merchant, such that each gift chosen by the registrant will be identified as being from a certain merchant;

transferring the information received and stored by the portable input and storage device into the computer system via the transfer device; and interfacing with a prospective purchaser such that the prospective purchaser can view a list of the gifts desired by the registrant and the particular merchants the gifts are from.

14. The method as in claim 13 further including the step of updating the information stored in the computer system to reflect gifts that have been purchased for a particular registrant.

* * * * *